(12) United States Patent
Chen et al.

(10) Patent No.: US 12,647,602 B2
(45) Date of Patent: Jun. 2, 2026

(54) TEMPLATE MATCHING FOR FLIPPED INTRA BLOCK COPY

(71) Applicant: QUALCOMM Incorporated, San Diego, CA (US)

(72) Inventors: Chun-Chi Chen, San Diego, CA (US); Han Huang, San Diego, CA (US); Zhi Zhang, Munich (DE); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 52 days.

(21) Appl. No.: 18/402,496

(22) Filed: Jan. 2, 2024

(65) Prior Publication Data

US 2024/0223797 A1 Jul. 4, 2024

Related U.S. Application Data

(60) Provisional application No. 63/479,718, filed on Jan. 12, 2023, provisional application No. 63/478,462, filed on Jan. 4, 2023.

(51) Int. Cl.

| | |
|---|---|
| ***H04N 19/513*** | (2014.01) |
| ***H04N 19/105*** | (2014.01) |
| ***H04N 19/159*** | (2014.01) |
| ***H04N 19/176*** | (2014.01) |
| ***H04N 19/523*** | (2014.01) |

(52) U.S. Cl.

CPC ......... *H04N 19/521* (2014.11); *H04N 19/105* (2014.11); *H04N 19/159* (2014.11); *H04N 19/176* (2014.11); *H04N 19/523* (2014.11)

(58) Field of Classification Search

None

See application file for complete search history.

(56) References Cited

U.S. PATENT DOCUMENTS

| | | | | |
|---|---|---|---|---|
| 11,159,788 | B2 | 10/2021 | Chen et al. | |
| 2024/0022711 | A1* | 1/2024 | Li | H04N 19/46 |
| 2024/0022763 | A1* | 1/2024 | Chen | H04N 19/159 |

(Continued)

FOREIGN PATENT DOCUMENTS

WO 2022214244 A1 10/2022

OTHER PUBLICATIONS

Bross B., et al., “Versatile Video Coding Editorial Refinements on Draft 10”, JVET-T2001-v2, 20th JVET Meeting, Oct. 7, 2020-Oct. 16, 2020, Teleconference, (The Joint Video Experts Team of ITU-T SG 16 WP 3 and ISO/IEC JTC 1/SC 29), Nov. 24, 2020, pp. 1-515.

(Continued)

*Primary Examiner* — Lindsay J Uhl

(74) *Attorney, Agent, or Firm* — Shumaker & Sieffert, P.A.

(57) ABSTRACT

An example device for decoding video data includes a memory configured to store video data; and a processing system implemented in circuitry and configured to: decode a block vector difference (BVD) value for a current block of video data; determine an initial block vector for the current block of video data using intra template matching prediction (IntraTMP); apply the BVD value to the initial block vector to form a final block vector for the current block of video data; and decode the current block using the final block vector.

26 Claims, 17 Drawing Sheets

(56) References Cited

U.S. PATENT DOCUMENTS

2024/0137515 A1* 4/2024 Zhao .................... H04N 19/105
2024/0179302 A1* 5/2024 Rufitskiy ............. H04N 19/105

OTHER PUBLICATIONS

Chen C-C (Qualcomm Inc)., et al., "Non-EE2: Template Matching for RR-IBC", Joint Video Experts Team (JVET) of ITU-T SG 16 WP 3 and ISO/IEC JTC 1/SC 29, JVET-AC0169-v1, 29th Meeting, By Teleconference, Jan. 11, 2023-Jan. 20, 2023, No. JVET-AC0169, m61751, Jan. 4, 2023, 2 Pages.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Chen Y-W., et al., "Description of SDR, HDR and 360° Video Coding Technology Proposal by Qualcomm and Technicolor—Low and High Complexity Versions", Joint Video Exploration Team (JVET) of ITU-T SG 16 WP 3 and ISO/IEC JTC 1/SC 29/WG 11, JVET-J0021, 10th Meeting, San Diego, US, Apr. 20, 2018-Apr. 20, 2018, No. JVET-J0021, Apr. 14, 2018, pp. 1-44.

Coban M., et al., "Algorithm Description of Enhanced Compression Model 7 (ECM 7)", JVET-AB2025, m61505, Joint Video Experts Team (JVET) of ITU-T SG 16 WP 3 and ISO/IEC JTC 1/SC 29, 28th Meeting, Mainz, DE, Oct. 20, 2022-Oct. 28, 2022, 62 Pages, Dec. 22, 2022.

International Search Report and Written Opinion—PCT/US2024/010150—ISA/EPO—Mar. 14, 2024.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Ohm J-R., "Meeting Report of the 29th Meeting of the Joint Video Experts Team (JVET), By Teleconference, Jan. 11-20, 2023", Joint Video Experts Team (JVET) of ITU-T SG 16 WP 3 and ISO/IEC JTC 1/SC 29, JVET-AC1000-v1, 29th Meeting, By Teleconference, Jan. 11, 2023-Jan. 20, 2023, No. JVET-AC1000, m62425, Feb. 17, 2023, 292 Pages.

Ray B (Qualcomm)., et al., "Non-EE2: IBC Adaptation for Coding of Natural Content", Joint Video Experts Team (JVET) of ITU-T SG 16 WP 3 and ISO/IEC JTC 1/SC 29, JVET-AC0161-v3, 29th Meeting, By Teleconference, Jan. 11, 2023-Jan. 20, 2023, No. JVET-AC0161, m61743, Jan. 13, 2023, 4 Pages.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, Jan. 1, 2012, 20 Pages.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, No. JCTVC-N1003_v1, 14th Meeting, Vienna, AT, Jul. 25-Aug. 2, 2013, 311 Pages.

Zhang Z (Qualcomm Incorporated)., et al., "Non-EE2: IBC MBVD List Derivation", Joint Video Experts Team (JVET) of ITU-T SG 16 WP 3 and ISO/IEC JTC 1/SC 29, JVET-AC0159-v2, 29th Meeting, By Teleconference, Jan. 11, 2023-Jan. 20, 2023, No. JVET-AC0159, m61741, Jan. 15, 2023, 3 Pages.

* cited by examiner

TEMPLATE MATCHING FOR FLIPPED INTRA BLOCK COPY

This application claims the benefit of U.S. Provisional Application No. 63/478,462, filed Jan. 4, 2023, and of U.S. Provisional Application No. 63/479,718, filed Jan. 12, 2023, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called “smart phones,” video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding (encoding and decoding) video data using intra-block copy. That is, block-based video coding generally includes predicting a current block of video data and coding a residual block representing sample-by-sample differences between the prediction block and actual values for the block. Intra-block copy (IBC) is a prediction technique involving using a previously decoded (i.e., reconstructed) block of a current picture as a prediction block for a current block of the current picture. The prediction block may be identified relative to a position of the current block using a block vector, sometimes referred to as a displacement vector. The block vector may be formed using intra template matching prediction (IntraTMP), by which a video encoder or video decoder may compare a current template region beside a current block to reference template regions beside potential reference blocks, and select one of the reference blocks for which the current template region best matches the reference template region. According to the techniques of this disclosure, the block vector may be refined using a block vector difference (BVD) value. That is, the video encoder may determine an appropriate actual block vector for the current block vector, then determine the BVD value, representing a difference between the actual block vector and the block vector determined using IntrTMP. The video decoder may then determine the initial block vector using IntraTMP, then apply the BVD value to the initial block vector to form a final block vector for the current block to be used to decode the current block.

In one example, a method of decoding video data includes: decoding a block vector difference (BVD) value for a current block of video data; determining an initial block vector for the current block of video data using intra template matching prediction (IntraTMP); applying the BVD value to the initial block vector to form a final block vector for the current block of video data; and decoding the current block using the final block vector.

In another example, a device for decoding video data includes a memory configured to store video data; and a processing system implemented in circuitry and configured to: decode a block vector difference (BVD) value for a current block of video data; determine an initial block vector for the current block of video data using intra template matching prediction (IntraTMP); apply the BVD value to the initial block vector to form a final block vector for the current block of video data; and decode the current block using the final block vector.

In another example, a device for decoding video data includes means for decoding a block vector difference (BVD) value for a current block of video data; means for determining an initial block vector for the current block of video data using intra template matching prediction (IntraTMP); means for applying the BVD value to the initial block vector to form a final block vector for the current block of video data; and means for decoding the current block using the final block vector.

In another example, a computer-readable storage medium has stored thereon instructions that, when executed, cause a processing system of a device for decoding video data to: decode a block vector difference (BVD) value for a current block of video data; determine an initial block vector for the current block of video data using intra template matching prediction (IntraTMP); apply the BVD value to the refined block vector to form a final block vector for the current block of video data; and decode the current block using the final block vector.

The details of one or more examples are set forth in the accompanying drawings and the description below. Other features, objects, and advantages will be apparent from the description, drawings, and claims.

DETAILED DESCRIPTION

Figure 1:
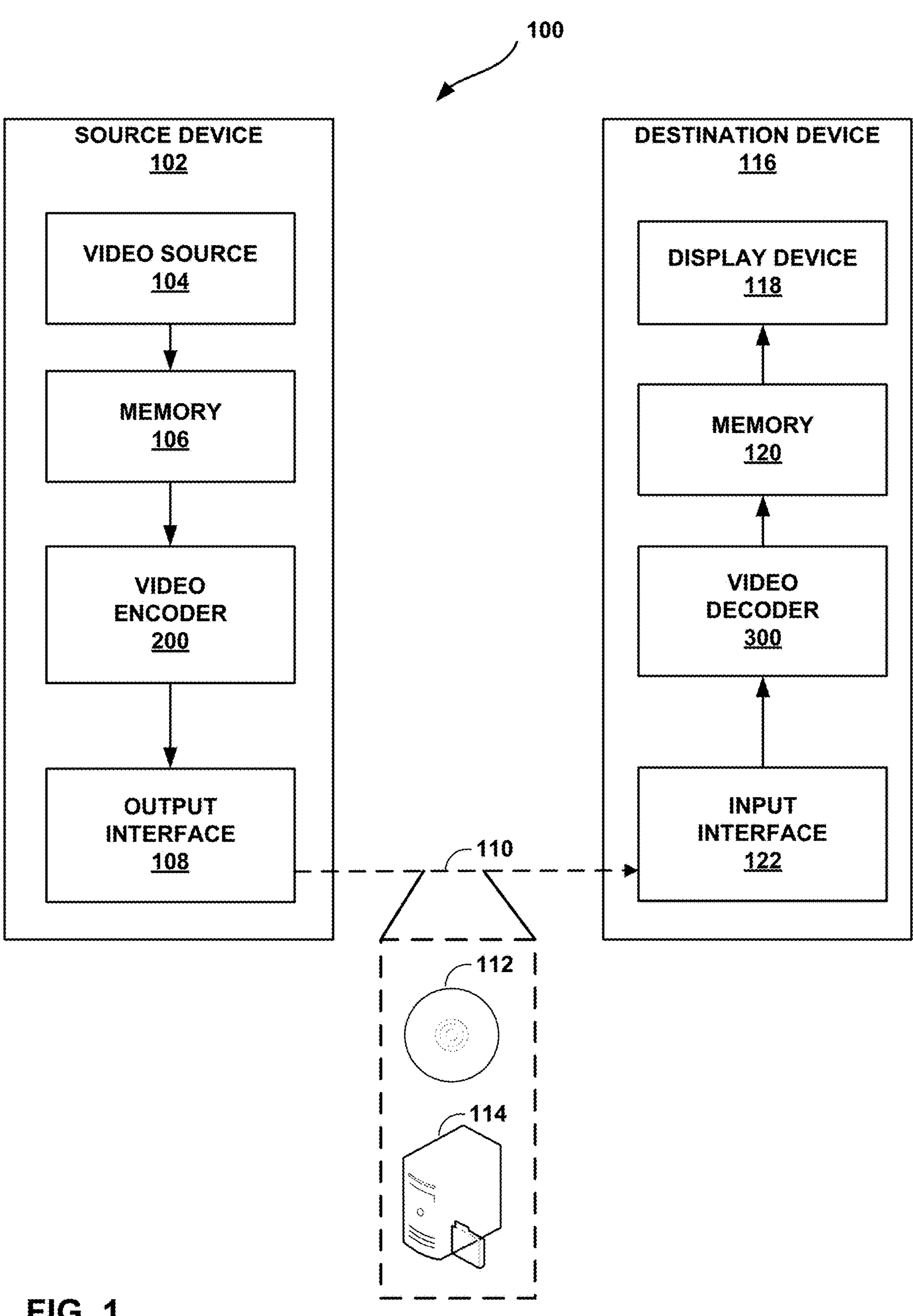
FIG. 1 is a block diagram illustrating an example video encoding and decoding system that may perform the techniques of this disclosure.

Block-based video coding generally includes predicting a current block of video data and coding a residual block representing sample-by-sample differences between the prediction block and actual values for the block. Intra-block copy (IBC) is a prediction technique involving using a previously decoded (i.e., reconstructed) block of a current picture as a prediction block for a current block of the current picture. The prediction block may be identified relative to a position of the current block using a block vector, sometimes referred to as a displacement vector. According to the techniques of this disclosure, a current block may be predicted from a reference block using intra-block copy when the reference block is a reconstruction-reordering IBC block.

In particular, a video coder (such as a video encoder or a video decoder) may perform the techniques of this disclosure when a current block is to be IBC-predicted using a refined block vector. The video coder may perform the techniques of this disclosure to refine the block vector when the block vector refers to a flipped block. That is, during encoding, a video encoder may flip a current block around the horizontal or vertical axis and then predict and encode the flipped block. The video decoder may decode the flipped block and then flip the block around the same axis to reproduce the block. Flipping the block around the horizontal or vertical axis for prediction and coding may improve prediction when a symmetric reference block can be used to predict the block.

With respect to the current block that is to be predicted using IBC relative to a flipped block, the video coder may use template matching to refine the block vector. Rather than using template areas above and to the left of the reference block in the current picture, the video coder may refer to either a right-neighboring template and/or a bottom-neighboring template of the flipped block, according to a manner in which the reference block is flipped. That is, if the reference block is flipped using horizontal mode, then a right-neighboring template to the reference block is used. If the reference block is flipped using vertical mode, then a bottom-neighboring template to the reference block is used.

Additionally or alternatively, a video coder may use intra template matching prediction (IntraTMP) to form an initial motion vector for a current block of video data. For example, the video coder may determine one or more current template regions beside a current block of video data. The video coder may then compare the current template regions to reference template regions of potential reference blocks for the current block. The video coder may identify the potential reference blocks according to a displacement search. After finding the reference template blocks that best match the current template regions, the video coder may determine that the reference block for the current block corresponds to the reference block corresponding to the best matching reference template blocks. Thus, the video coder may determine a block vector representing the position offset between the current block and the reference block.

According to the techniques of this disclosure, a video coder may code a block vector difference (BVD) value representing a difference between the block vector determined according to IntraTMP and an actual block vector for the current block. For example, a video encoder may perform a displacement search to determine the actual block vector for a current block. The video encoder may also perform the IntraTMP process described above to determine an initial block vector according to IntraTMP. The video encoder may then encode a BVD value representing the difference between the initial block vector and the actual block vector. The video encoder may form a prediction block for the current block using the actual block vector, then encode the current block using the prediction block, as well as the BVD value for the current block.

A video decoder may then decode the BVD value for the current block and data indicating that the current block is to be predicted using IntraTMP along with the BVD value. Thus, the video decoder may perform IntraTMP to form an initial block vector for the current block. The video decoder may then combine the initial block vector with the BVD value to reproduce the actual block vector for the current block. The video decoder may further generate a prediction block using the actual block vector, then decode the current block using the prediction block.

In some examples, the video encoder and the video decoder may further refine the initial block vector, e.g., using the refinement techniques discussed above, such that the BVD value represents a difference between the refined block vector and the actual block vector. In this manner, the techniques of this disclosure may allow template matching to be performed for an IBC-coded block when a reference block is flipped. Thus, a prediction block may be more accurate with respect to the block encoded using IBC.

Moreover, the BVD value may require a relatively small amount of bits to code, but may greatly improve accuracy of the prediction block generated for the current block. As such, a residual value may be smaller for the block, thereby reducing bitrate and increasing coding performance.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC specification, referred to as "HEVC," is available from phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The latest version of reference software, i.e., VVC Test Model 19 (VTM-19.0) may be retrieved from vegit.hhi.fraunhofer.de/jvet/VVCSoftware_VTM.

The Versatile Video Coding (VVC) specification may be referred to as "JVET-T2001." An algorithm description of Versatile Video Coding and Test Model 10 (VTM 10.0) may be referred to as "JVET-T2002." An algorithm description of Enhanced Compression Model 7 (ECM-7.0) may be referred to as "JVET-AB2025."

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing template matching to refine a block vector for an intra-block copy (IBC) block that refers to a flipped reference block. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for performing template matching to refine a block vector for an intra-block copy (IBC) block that refers to a flipped reference block. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any other video coding techniques.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

According to the techniques of this disclosure, video encoder 200 may also determine to predict a current block using intra-block copy (IBC) mode. In IBC mode, video encoder 200 may predict a current block in a current frame from a previously encoded block in the same frame. Video encoder 200 may perform a displacement search to determine an actual block vector (sometimes referred to as a displacement vector) that identifies the position of a reference block relative to the position of the current block. Video encoder 200 may then encode the actual block vector.

Per the techniques of this disclosure, to encode the actual block vector for a current block, video encoder 200 may first determine a predicted block vector using intra template matching prediction (IntraTMP). The current block may neighbor one or more templates, which may be above and/or to the left of the current block and may have been previously encoded and subsequently decoded. Video encoder 200 may perform a displacement search using the one or more templates to determine various sets of templates neighboring potential reference blocks. Video encoder 200 may determine which of the sets of templates best matches the one or more templates neighboring the current block.

Video encoder 200 may then determine a block vector indicating the position of the one of the sets of templates that best matches the one or more templates neighboring the current block. This block vector may act as a predictor for the actual block vector for the current block. That is, to encode the actual block vector, video encoder 200 may calculate a block vector difference (BVD) value representing a difference between the actual block vector and the predictor. For example, the BVD value may represent a horizontal and/or vertical offset of a number of pixels between the actual block vector and the predictor. To encode the BVD value, video encoder 200 may encode an index into a set of potential BVD values, where the index corresponds to the BVD value for the current block (representing the difference between the actual block vector and the predictor).

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In some examples, the signaled prediction mode may be intra-block copy (IBC). In some examples, prediction information for the IBC mode may include a block vector difference (BVD) value. Video decoder 300 may perform a displacement vector search according to IntraTMP as discussed above to determine an initial block vector. Video decoder 300 may then apply the BVD value to the initial block vector to generate an actual displacement vector for the current block. Video decoder 300 may then generate a prediction block for the current block using the actual displacement vector and decode the current block using the prediction block. For example, video decoder 300 may add the prediction block to a residual block for the current block on a sample by sample basis.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
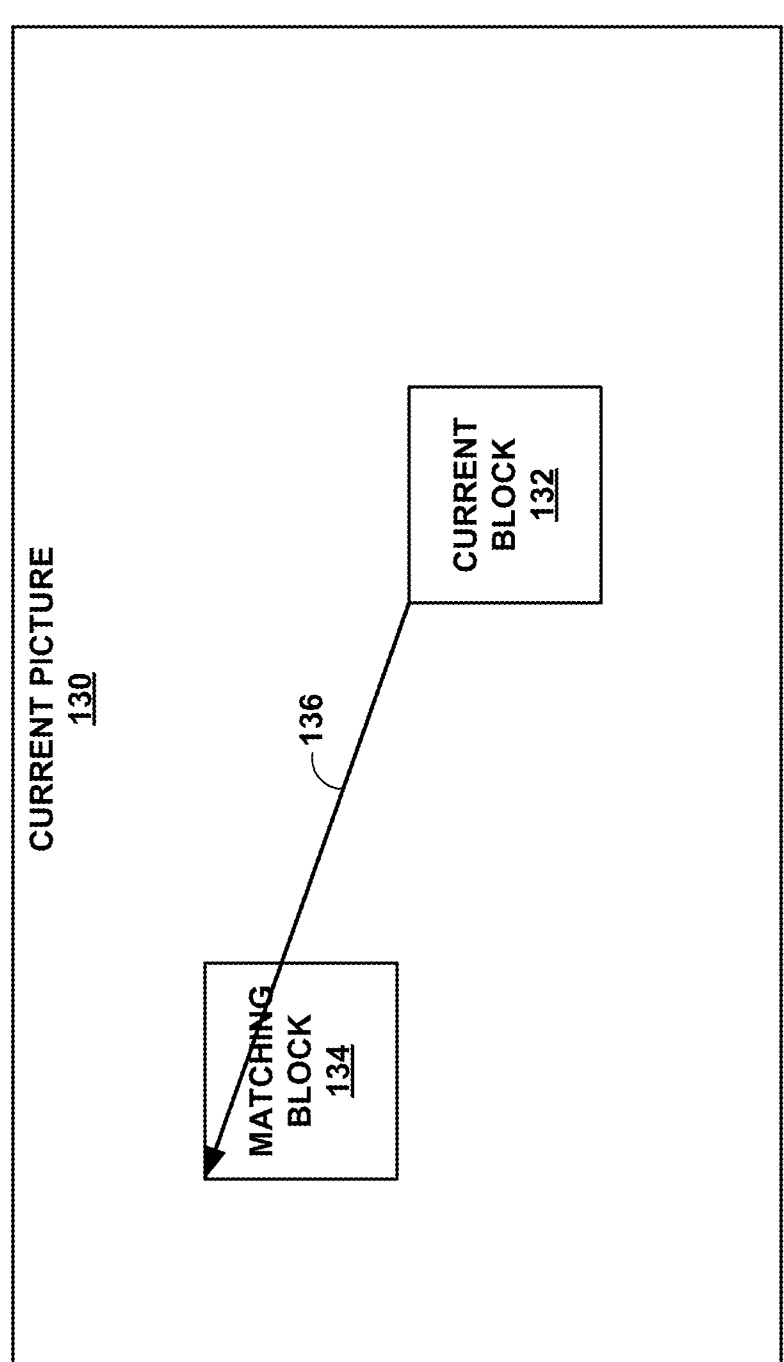
FIG. 2 is a conceptual diagram illustrating an example of intra-block copy (IBC).

FIG. 2 is a conceptual diagram illustrating an example of intra-block copy (IBC). IBC is a coding tool for screen content. In some examples, when performing IBC for a current coding unit (CU), such as current block 132, video encoder 200 may perform IBC to search all block vectors and find the best matching block 134 in the reference region as a prediction block for current block 132, as shown in FIG. 2. Then, video encoder 200 may form a prediction of the chosen block vector 136 and calculate the difference between the chosen block vector 136 and the predicted block vector, referred to as block vector difference (BVD). Video encoder 200 may further signal the BVD in the bitstream. In this manner, video decoder 300 may use the BVD to reproduce the block vector and perform IBC to predict and decode the current block.

In some examples, per the techniques of this disclosure, video encoder 200 may form the predicted block vector using IntraTMP. That is, video encoder 200 may determine one or more template regions neighboring potential reference blocks for current block 132. Then video encoder 200 may determine a predictor block vector that identifies the positions of the one or more template regions that best match one or more template regions neighboring current block 132. Video encoder 200 may then calculate the BVD representing the difference between block vector 136 and the predictor block vector.

In this manner, video decoder 300 may perform IntraTMP to determine the predictor block vector. Video decoder 300 may also decode the BVD and add the BVD to the predictor block vector to reconstruct block vector 136. Video decoder 300 may then use block vector 136 to predict current block 132 using matching block 134, to which block vector 136 points. Video decoder 300 may then decode current block 132 using the data of matching block 134 to generate a prediction block.

Figure 3:
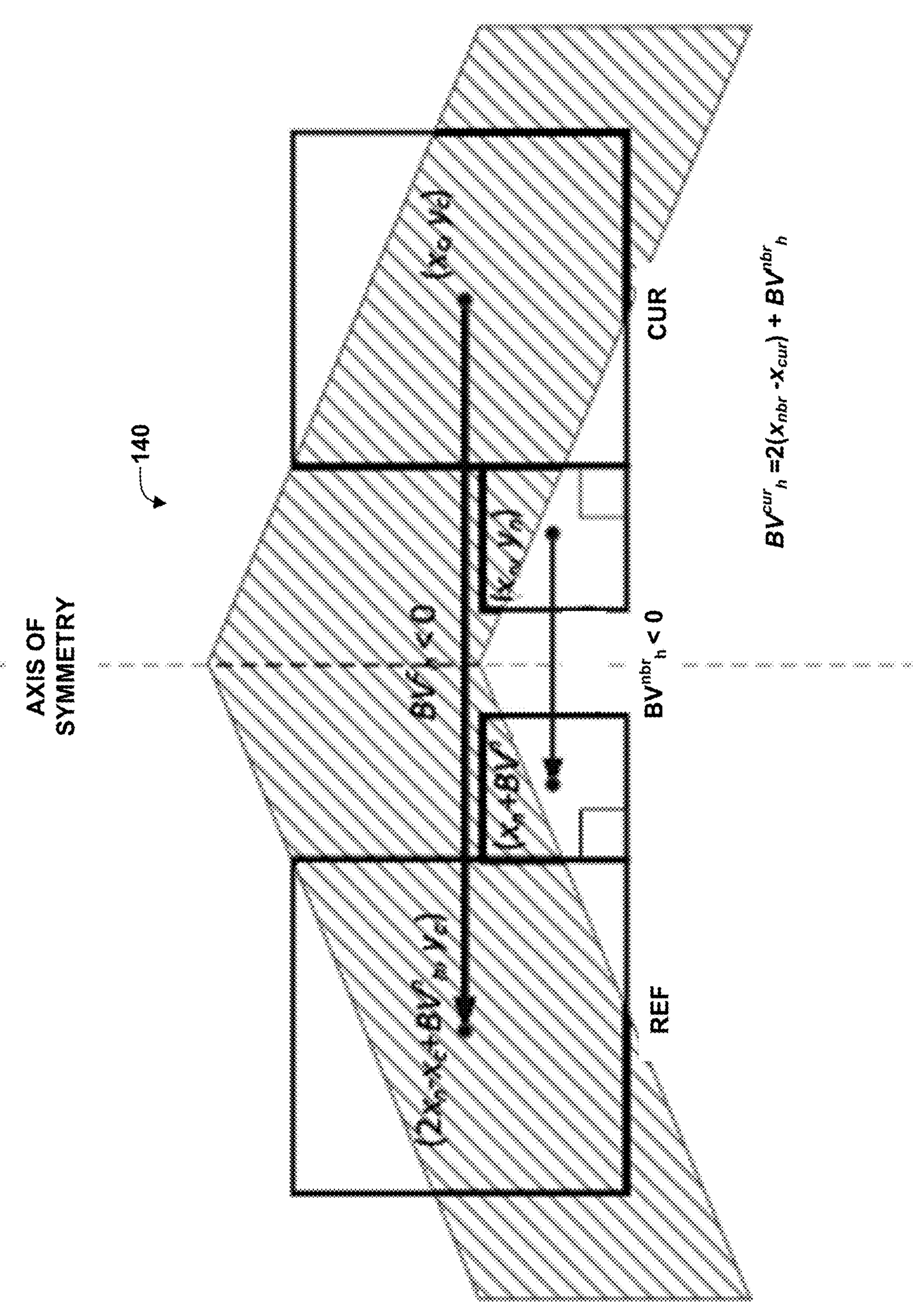
FIGS. 3 and 4 are conceptual diagrams illustrating examples of flipping a block of video data.
Figure 4:
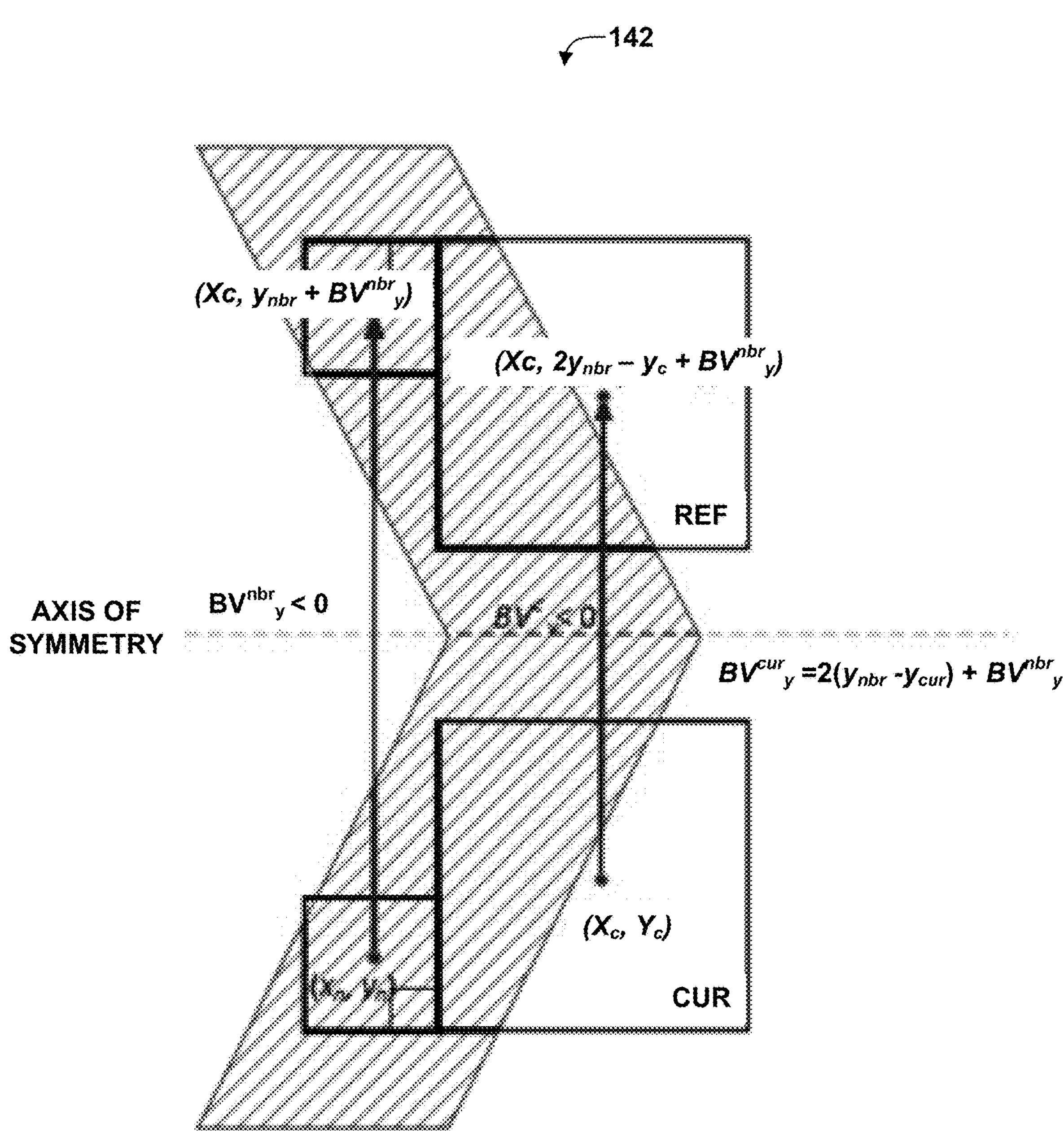

FIGS. 3 and 4 are conceptual diagrams illustrating examples of flipping a block of video data. FIG. 3 depicts an example of a horizontal flip 140. FIG. 4 depicts an example of a vertical flip 142. A Reconstruction-Reordered IBC (RR-IBC) mode is allowed for IBC coded blocks. When RR-IBC is applied, the samples in a reconstruction block are flipped according to a flip type of the current block. At the encoder side, the original block is flipped before motion search and residual calculation, while the prediction block is derived without flipping. At the decoder side, the reconstruction block is flipped back to restore the original block.

Two flip methods, horizontal flip and vertical flip, are supported for RR-IBC coded blocks. A syntax flag is firstly signalled for an IBC AMVP coded block, indicating whether the reconstruction is flipped, and if it is flipped, another flag is further signaled specifying the flip type. For IBC merge, the flip type is inherited from neighbouring blocks, without syntax signalling. Considering the horizontal or vertical symmetry, the current block and the reference block are normally aligned horizontally or vertically. Therefore, when a horizontal flip is applied, the vertical component of the BV is not signaled and inferred to be equal to 0. Similarly, the horizontal component of the BV is not signaled and inferred to be equal to 0 when a vertical flip is applied.

To better utilize the symmetry property, a flip-aware BV adjustment approach is applied to refine the block vector candidate. For example, as shown in FIGS. 3 and 4, $(x_{nbr}, y_{nbr})$ and $(x_{cur}, y_{cur})$ represent the coordinates of the center sample of the neighbouring block and the current block, respectively, $BV^{nbr}$ and $BV^{cur}$ denotes the BV of the neighbouring block and the current block, respectively. Instead of directly inheriting the BV from a neighbouring block, the horizontal component of $BV_{cur}$ is calculated by adding a motion shift to the horizontal component of $BV^{nbr}$ (denoted as $BV_h^{nbr}$) in case that the neighbouring block is coded with a horizontal flip, i.e., $BV_h^{cur}=2(x_{nbr}-x_{cur})+BV_h^{nbr}$. Similarly, the vertical component of $BV^{cur}$ is calculated by adding a motion shift to the vertical component of $BV^{nbr}$ (denoted as $BV_v^{nbr}$) in case that the neighbouring block is coded with a vertical flip, i.e., $BV_v^{cur}=2(y_{nbr}-y_{cur})+BV_v^{nbr}$.

Figure 5:
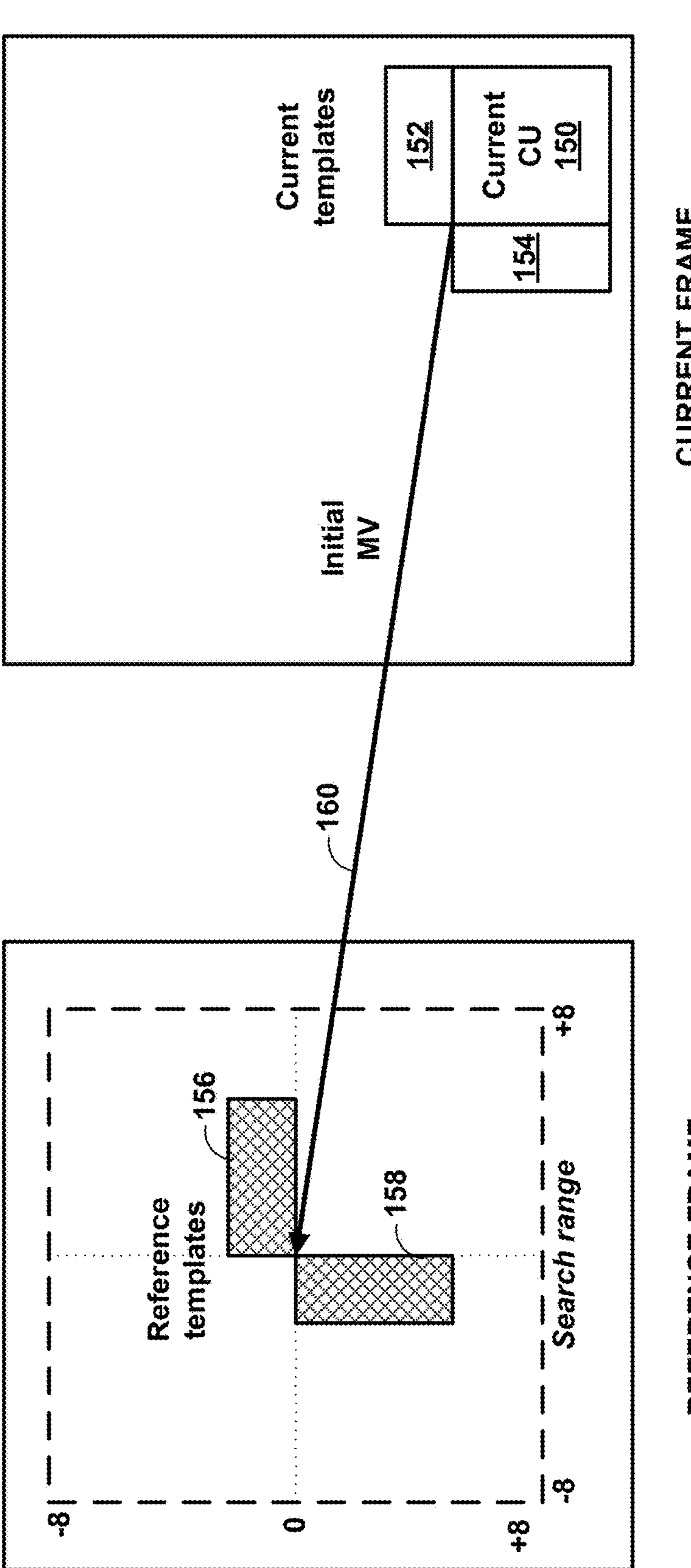
FIG. 5 is a conceptual diagram illustrating an example of template matching to refine a block vector or a motion vector.

FIG. 5 is a conceptual diagram illustrating an example of template matching to refine a block vector or a motion vector. Template matching (TM) is a decoder-side motion vector (MV) derivation method to refine the motion information of the current CU by finding the closest match between a template (i.e., top and/or left neighbouring blocks of the current CU) in the current picture and a block (i.e., same size to the template) in a reference picture. It is applied to both AMVP and regular merge mode called respectively as TM-AMVP and TM-MRG modes.

As illustrated in FIG. 5, a better MV is searched around the initial motion of the current CU within a [−8, +8]-pel (pixel, or sample) search range. The template matching method in JVET-J0021 is used with the following modifications: search step size is determined based on AMVR mode and TM can be cascaded with bilateral matching process in merge modes. In particular, current CU 150 neighbors neighboring templates 152 and 154. Initial motion vector 160 references the location of reference templates 156 and 158, which correspond to the positions of neighboring templates 152 and 154, respectively. The position to which motion vector 160 points is a starting position, and then a motion search can be performed to compare reference templates corresponding to the point to which the adjusted motion vector refers. If these reference templates better match neighboring templates 152 and 154, e.g., based on SAD, SSD, MAD, MSD, or other such metrics, then the adjusted motion vector may be used as the actual motion vector when predicting current CU 150.

In TM-AMVP mode, an MVP candidate is determined based on template matching error to select the one which reaches the minimum difference between the current block template and the reference block template, and then TM is performed only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1 below. This search process ensures that the MVP candidate still keeps the same MV precision as indicated by the AMVR mode after TM process. In the search process, if the difference between the previous minimum cost and the current minimum cost in the iteration is less than a threshold that is equal to the area of the block, the search process terminates.

TABLE 1

| | AMVR mode | | | | Merge mode | |
|---|---|---|---|---|---|---|
| Search pattern | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In TM-MRG merge mode, similar search method is applied to the merge candidate indicated by the merge index. As Table 1 shows, TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

Figure 6:
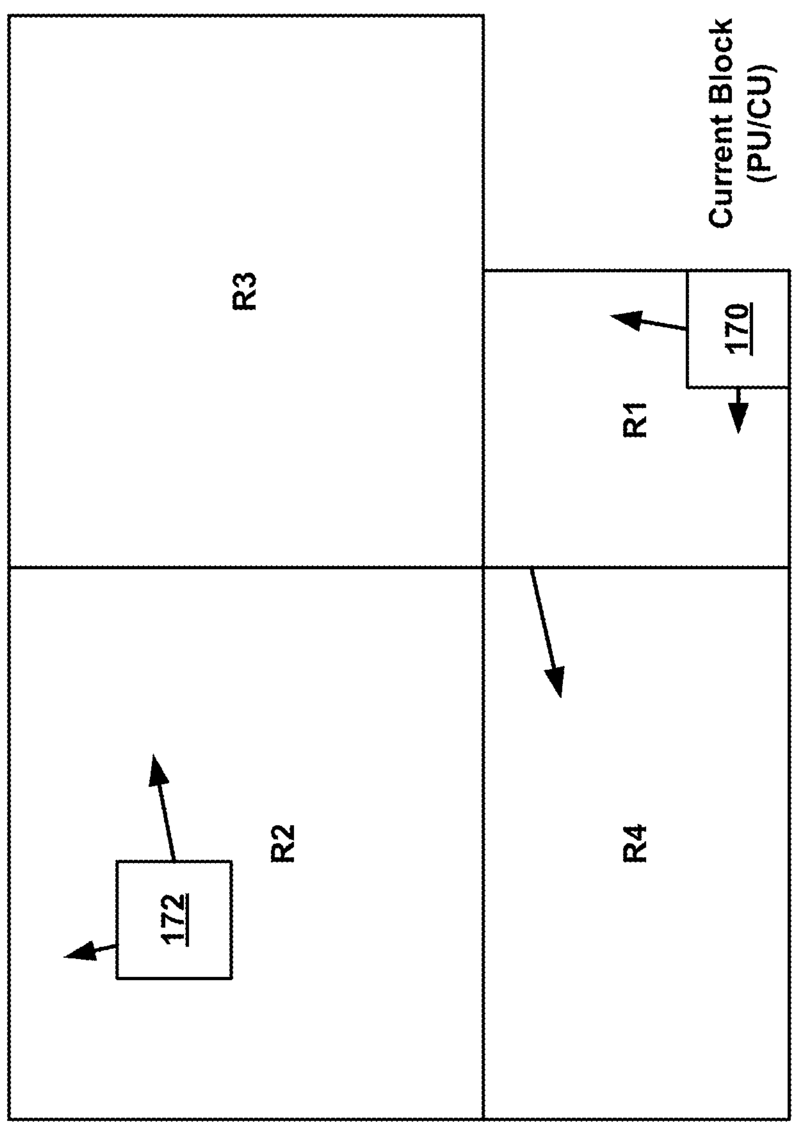
FIG. 6 is a conceptual diagram illustrating an example of intra template matching prediction (IntraTMP).

FIG. 6 is a conceptual diagram illustrating an example of intra template matching prediction (IntraTMP). Intra template matching prediction (IntraTMP) is a special intra prediction mode that copies the best prediction block from the reconstructed part of the current frame, whose L-shaped template matches the current template. That is, current block 170 represents a current block to be coded (encoded or decoded). Video coders such as video encoder 200 and video decoder 300 may compare templates neighboring current block 170 and templates neighboring potential reference blocks a predefined search area to determine a block vector for current block 170 (e.g., a vector that refers to reference block 172). For a predefined search range, the encoder (e.g., video encoder 200) searches for the most similar template to the current template in a reconstructed part of the current frame and uses the corresponding block as a prediction block. The encoder then signals the usage of this mode, and the same prediction operation is performed at the decoder side, without needing to signal the block vector.

The prediction signal is generated by matching the L-shaped causal neighbor of the current block with another block in a predefined search area in FIG. 6 including:

R1: current CTU

R2: top-left CTU

R3: above CTU

R4: left CTU

Sum of absolute differences (SAD) may used as a cost function. Other potential cost functions include mean absolute differences (MAD), sum of squared distances (SSD), and mean squared differences (MSD). Within each region, the decoder searches for the template that has least SAD (or other difference metric) with respect to the templates for current block 170 and uses its corresponding block as a prediction block.

The dimensions of all regions (SearchRange_w, SearchRange_h) may be set proportional to the block dimension (BlkW, BlkH) to have a fixed number of SAD comparisons per pixel. That is:

$$\text{SearchRange\_w} = 5 * BlkW$$

$$\text{SearchRange\_h} = 5 * BlkH$$

The Intra template matching tool is enabled for CUs with size less than or equal to 64 in width and height. This maximum CU size for Intra template matching is configurable.

The Intra template matching prediction mode is signaled at CU level through a dedicated flag when DIMD is not used for current CU.

Figure 7A:
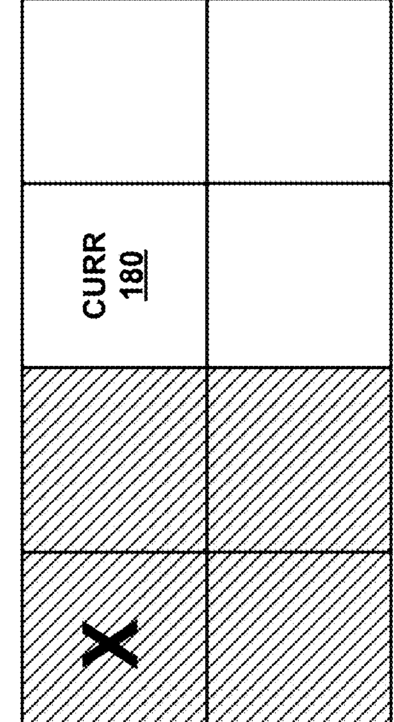
FIGS. 7A-7D are conceptual diagrams illustrating example IBC reference regions depending on a current block position.
Figure 7B:
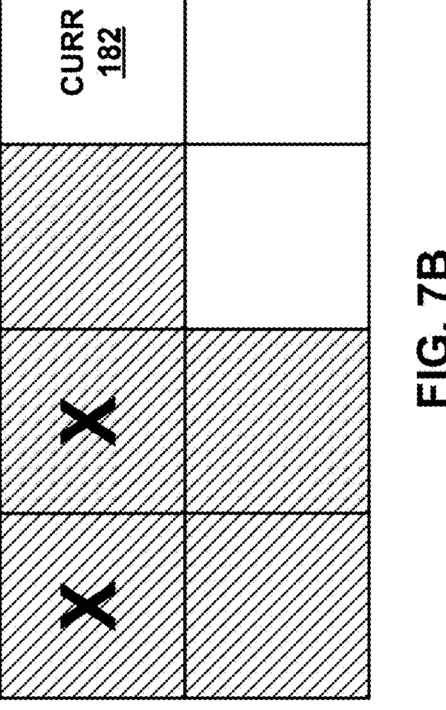
Figure 7C:
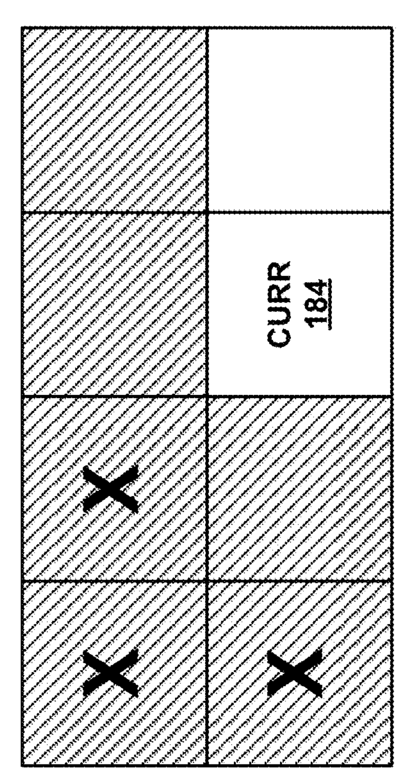
Figure 7D:
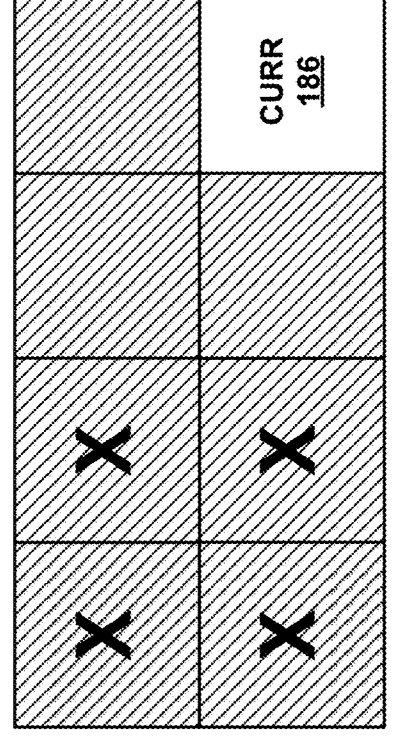

FIGS. 7A-7D are conceptual diagrams illustrating example IBC reference regions depending on a current block position. FIG. 7A depicts current block 180, FIG. 7B depicts current block 182, FIG. 7C depicts current block 184, and FIG. 7D depicts current block 186. Template matching may be used in IBC for both IBC merge mode and IBC AMVP mode, called respectively as IBC-TM-AMVP and IBC-TM-MRG.

In IBC-TM-MRG, the merge list is modified compared to the one used by regular IBC merge mode such that the candidates are selected according to a pruning method with a motion distance between the candidates as in the regular TM merge mode. The ending zero motion fulfillment is replaced by motion vectors to the left (−W, 0), top (0, −H) and top-left (−W, −H), where W is the width and H the height of the current CU. In addition, the selected candidates are refined with the Template Matching method prior to the RDO or decoding process. The IBC-TM-MRG mode has been put in competition with the regular IBC merge mode and a TM-merge flag is signaled.

In the IBC-TM-AMVP mode, up to 3 candidates are selected from the IBC-TM-MRG merge list. Each of those 3 selected candidates are refined using the Template Matching method and sorted according to their resulting Template Matching cost. Only the 2 first ones are then considered in the motion estimation process.

The Template Matching refinement for both IBC-TM merge and AMVP modes is quite simple since IBC motion vectors are constrained (i) to be integer and (ii) within a reference region as shown in FIG. 7. So, in IBC-TM-MRG mode, all refinements are performed at integer precision, and in IBC-TM-AMVP mode, they are performed either at integer or 4-pel precision depending on the AMVR value. Such a refinement accesses only to samples without interpolation. In both cases, the refined motion vectors and the used template in each refinement step must respect the constraint of the reference region.

An IBC-TM-MRG coded block does not inherit flip type from a RR-IBC coded neighbor block.

An IBC-TM-AMVP coded block can also be a RR-IBC coded block with a horizontal or vertical flip type. In conventional video coding techniques, template matching does not apply in such case. However, per the techniques of this disclosure, as discussed in greater detail below, video encoder 200 and video decoder 300 may be configured to perform template matching in the case of an IBC-TM-AMVP or MRG coded block being an RR-IBC coded block with a horizontal or vertical flip type.

Affine-MMVD and GPM-MMVD have been adopted to ECM as an extension of regular MMVD mode. It is natural to extend the MMVD mode to the IBC merge mode.

In IBC-MBVD, the distance set is {1-pel, 2-pel, 4-pel, 8-pel, 12-pel, 16-pel, 24-pel, 32-pel, 40-pel, 48-pel, 56-pel, 64-pel, 72-pel, 80-pel, 88-pel, 96-pel, 104-pel, 112-pel, 120-pel, 128-pel}, and the BVD directions are two horizontal and two vertical directions.

The base candidates are selected from the first five candidates in the reordered IBC merge list. And based on the SAD cost between the template (one row above and one column left to the current block) and its reference for each refinement position, all the possible MBVD refinement positions (20×4) for each base candidate are reordered. Finally, the top 8 refinement positions with the lowest template SAD costs are kept as available positions, consequently for MBVD index coding. The MBVD index is binarized by the rice code with the parameter equal to 1. An IBC-MBVD coded block does not inherit flip type from a RR-IBC coded neighbor block.

This disclosure recognizes that the template matching technique in ECM-7.0 for an intra prediction block is performed only when the coded block does not use RR-IBC for an IBC-AMVP and an IBC-MRG block. Furthermore, in ECM-7.0, IntraTMP is used without signalling block vector difference. This disclosure describes techniques that may be used to perform template matching for a coded block using RR-IBC for an IBC-AMVP or an IBC-MRG block, as well as techniques for signaling and using a block vector difference.

Figure 8:
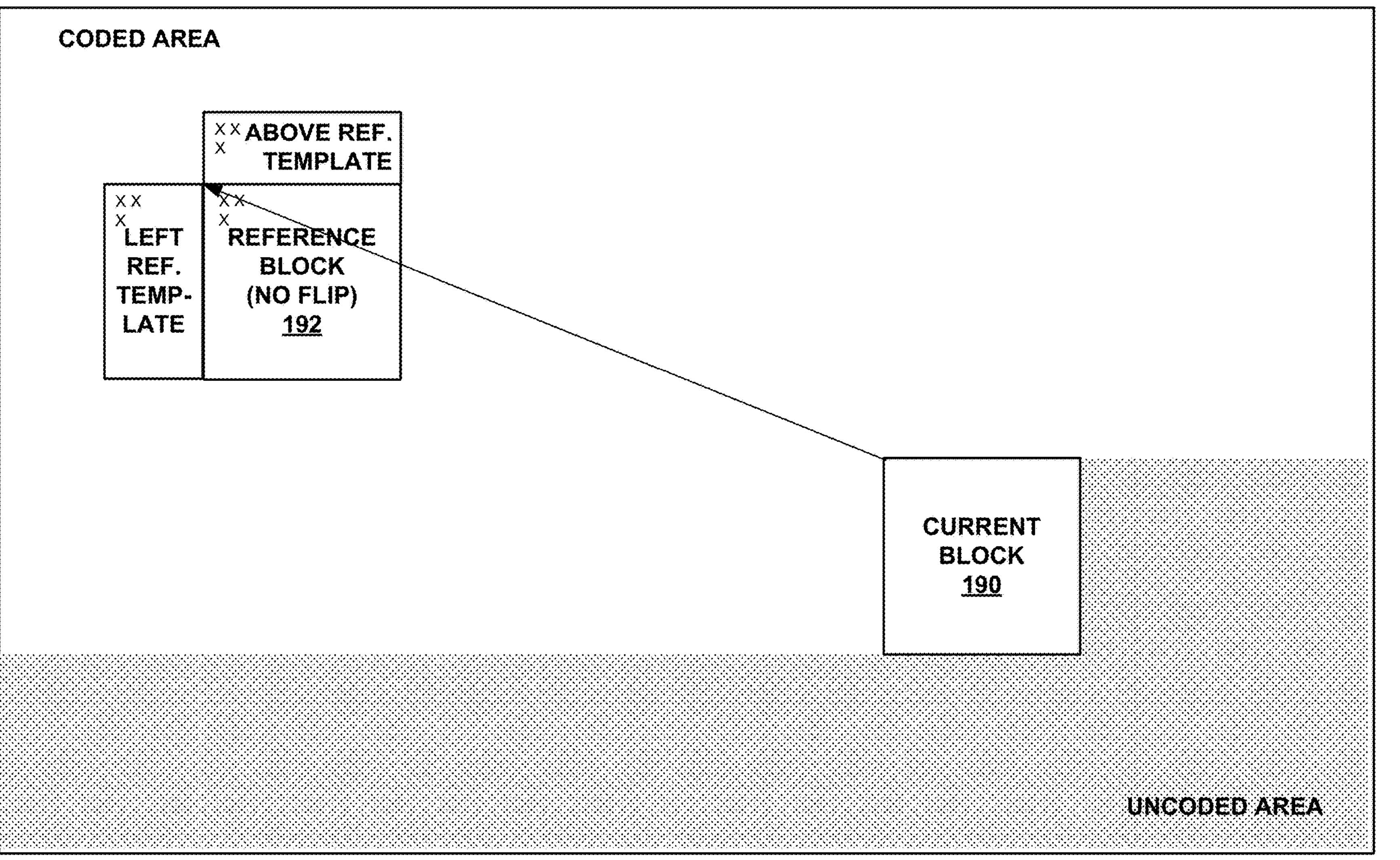
FIG. 8 is a conceptual diagram illustrating locations of neighboring reference templates without block flipping.
Figure 9:
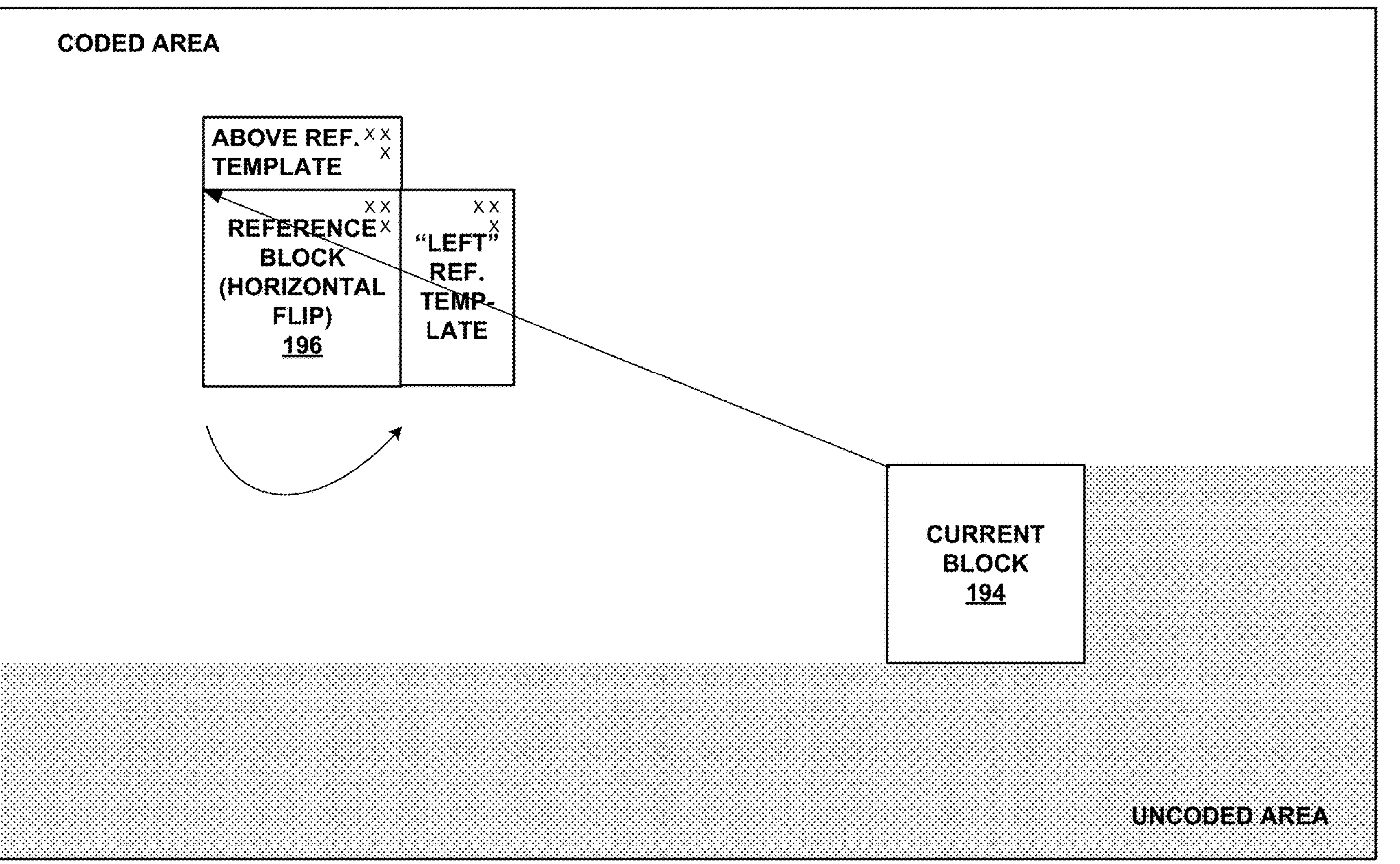
FIG. 9 is a conceptual diagram illustrating locations of neighboring reference templates when a block is flipped horizontally.
Figure 10:
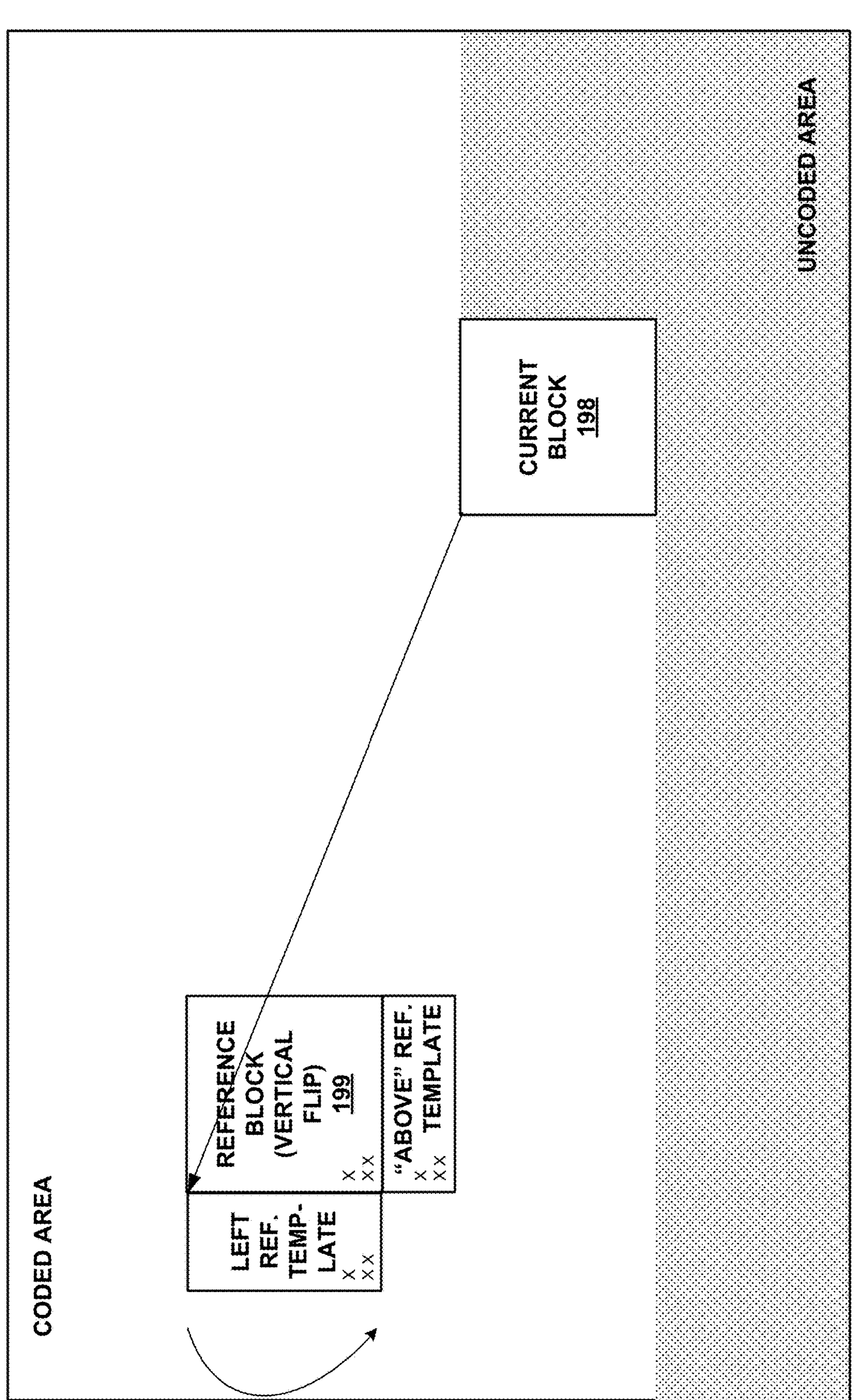
FIG. 10 is a conceptual diagram illustrating locations of neighboring reference templates when a block is flipped vertically.

FIGS. 8-10 are conceptual diagrams illustrating various shapes and positions of templates when an RR-IBC block is used as a reference block. FIG. 8 is a conceptual diagram illustrating locations of neighboring reference templates without flipping of reference block 192. Reference block 192 may be used to predict current block 190. FIG. 9 is a conceptual diagram illustrating locations of neighboring reference templates relative to horizontally flipped reference block 196. Horizontally flipped reference block 196 may be used to predict current block 194. FIG. 10 is a conceptual diagram illustrating locations of neighboring reference templates relative to vertically flipped reference block 199. Vertically flipped reference block 199 may be used to predict current block 198. Video encoder 200 and video decoder 300 may be configured to perform the techniques described with respect to FIGS. 8-10 below.

ECM supports 3 types of flip modes, which are none, horizontal mode and vertical mode. This disclosure describes techniques that may be used to extend the notion of RR-IBC to templates, as illustrated in the FIGS. 8-10. When a reference block (pointed to by an inferred BV) flips, the fetched reference samples of current CU and current templates also flip. In addition, the position of left reference template flips to the right of the reference block and that of the above one flips to the above of the reference block.

In some examples, a block vector constraint can be applied, in which one of the block vector components may be set equal to zero. For example, when horizontal mode is used, video encoder 200 or video decoder 300 may set the vertical component of the block vector equal to zero. As another example, when vertical mode is used, video encoder 200 or video decoder 300 may set the horizontal component of the block vector equal to zero.

This process may occur every time before a new candidate block vector is going to be pushed into an IBC AMVP or Merge candidate list. For example, video encoder 200 or video decoder 300 may set a block vector candidate component found from spatial or temporal causal neighborhood equal to zero, depending on what flip mode is in use as mentioned above. Then, video encoder 200 or video decoder 300 may perform the pruning process on this candidate block vector before inserting the candidate block vector into the IBC AMVP or IBC Merge candidate list.

Given the current CU size (i.e., W×H), an inferred BV (i.e., from AMVP or merge candidate), template size T (i.e., W×T for the above template and T×H for left template) and flip type, the respective TM cost is calculated based on Weighted Sum of Absolut Difference (SAD) as follows:

$$\text{Cost}_{None1}\ \sum\nolimits_{x\in\{0,\ldots,W-1\},y\in\{-T,\ldots,-1\}} w(x,y)*|C(x,y)-R(x+BVx,\ y+BVy)|+\sum\nolimits_{x\in\{-T,\ldots,-1\},y\in\{0,\ldots,H-1\}} w(x,y)*|C(x,y)-R(x+BVx,\ y+BVy)|,$$

$$\text{Cost}_{Hor1}\ \sum\nolimits_{x\in\{0,\ldots,W-1\},y\in\{-T,\ldots,-1\}} w(x,y)*|C(x,y)-R((W-1-x)+BVx,\ y+BVy)|+\sum\nolimits_{x\in\{-T,\ldots,-1\},y\in\{0,\ldots,H-1\}} w(x,y)*|C(x,y)-R((-1-x)+(BVx+W),\ y+BVy)|,$$

$$\text{Cost}_{Ver1}\ \sum\nolimits_{x\in\{0,\ldots,W-1\},y\in\{-T,\ldots,-1\}} w(x,y)*|C(x,y)-R(x+BVx,\ (-1-y)+(BVy+H))|+\sum\nolimits_{x\in\{-T,\ldots,-1\},y\in\{0,\ldots,H-1\}} w(x,y)*|C(x,y)-R(x+BVx,\ (H-1-y)+BVy)|,$$

In the equations above, C(x, y) and R(x,y) both denote the same value of a reconstructed luma sample located at (x, y) position relative to the top-left sample of the current CU and T is a positive integer (e.g., typically 1, 2, 3, 4, . . . ). In brief, these formulas formulate the same thing as that the reference templates are flips before TM cost is computed. In a special case when all weight values are 1, these cost functions are degenerated to be merely SAD.

Equivalently, these cost functions can be re-formulated to flip current templates instead of flipping reference ones to compute TM cost, as follows:

$$\text{Cost}_{None2}\ \text{Cost}_{None1}$$

$$\text{Cost}_{Hor2}\ \sum\nolimits_{x\in\{0,\ldots,W-1\},y\in\{-T,\ldots,-1)} w((W-1-x),y)*|C((W-1-x),y)-R(x+BVx,\ y+BVy)|+\sum\nolimits_{x\in\{0,\ldots,T-1\},y\in\{0,\ldots,H-1\}} w((-1-x),y)*|C((-1-x),y)-R(x+(BVx+W),\ y+BVy)|\text{Cost}_{Hor1},$$

$$\text{Cost}_{Ver2}\ \sum\nolimits_{x\in\{0,\ldots,W-1\},y\in\{0,\ldots,T-1)} w(x,(-1-y))*|C(x,(-1-y))-R(x+BVx,\ y+(BVy+H))|+\sum\nolimits_{x\in\{-T,\ldots,-1\},y\in\{0,\ldots,H-1\}} w(x,(H-1-y))*|C(x,(H-1-y))-R(x+BVx,\ y+BVy)|\text{Cost}_{Ver1}.$$

Figure 11:
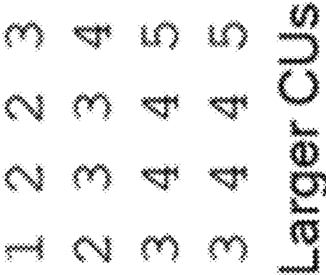
FIG. 11 is a conceptual diagram illustrating example sample-adaptive weights for template matching according to the techniques of this disclosure.
Figure 11:
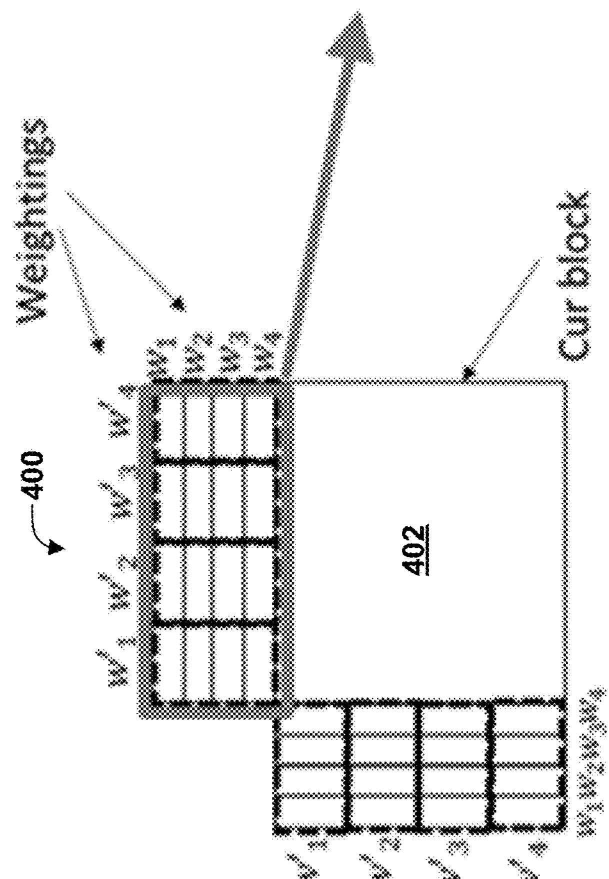

FIG. 11 is a conceptual diagram illustrating example sample-adaptive weights 400 for template matching according to the techniques of this disclosure. TM cost can be computed in the same way as Inter template matching, in which weighted Sum of Absolute Difference is applied. In general, each sample (i.e., C(x, y) in above formulas) is assigned with a power-of-2 weight, denoted as w(x,y), which is applied to the absolute difference before the summation is made as discussed above.

In one example, the assignment of w(x,y) could be based on the same region-based method as Inter template matching adopts. This method separates each of the current templates equally into 16 regions (as the below figure shows) and all samples in the same region share the same weight value. Regions coordinated respectively at ($w_m$, $w'_n$) on above template and ($w'_n$, $w_m$) on left template are assigned with the same weight.

The reference templates could sometimes overlap partially or completely with invalid area (defined by the current CU, non-coded area, and out-of-picture-boundary area) when flipping applies to IBC. The position clipping process may apply when any one of the samples of the reference template overlaps with the aforementioned invalid area. Specifically, video encoder 200 and video decoder 300 may modify BV, including adding a delta term before the absolute difference value at each sample location of the TM cost is computed, e.g., as follows:

$$\text{Cost}_{None1}\ \sum_{x\in\{0,\ldots,W-1\},y\in\{-T,\ldots,-1\}}|C(x,y)-R(x+BVx,\ y+BVy+\Delta y)|+\sum_{x\in\{-T,\ldots,-1\},y\in\{0,\ldots,H-1\}}|C(x,y)-R(x+BVx+\Delta x,\ y+BVy)|,$$

where Δy and Δx are basically set equal to 0 unless the following conditions satisfy:

Δy=T, when some samples {R(x+BVx, y+BVy)|x∈{0, W−1}, y∈{−T, −1} } overlap invalid area;

Δx=T, when some samples {R(x+BVx, y+BVy)|x∈{−T,−1}, y∈{0,H−1}} overlap invalid area.

$$\text{Cost}_{Hor1}\ \sum_{x\in\{0,\ldots,W-1\},y\in\{-T,\ldots,-1\}}|C(x,y)-R((W-1-x)+BVx,\ y+BVy+\Delta y)|+\sum_{x\in\{-T,\ldots,-1\},y\in\{0,\ldots,H-1\}}|C(x,y)-R((-1-x)+(BVx+\Delta x+W),\ y+BVy)|,$$

where Δy and Δx are basically set equal to 0 unless the following conditions satisfy:

Δy=T, when some samples {R(x+BVx, y+BVy)|x∈{0,W−1}, y∈{−T,−1} } overlap invalid area;

Δx=−T, when some samples {R(x+(BVx+W), y+BVy)|x∈{0,T−1}, y∈{0,H−1} } overlap invalid area.

$$\text{Cost}_{Ver1}\ \sum_{x\in\{0,\ldots,W-1\},y\in\{-T,\ldots,-1\}}|C(x,y)-R(x+BVx,\ (-1-y)+(BVy+\Delta y+H))|+\sum_{x\in\{-T,\ldots,-1\},y\in\{0,\ldots,H-1\}}|C(x,y)-R(x+BVx+\Delta x,\ (H-1-y)+BVy)|,$$

where Δy and Δx are basically set equal to 0 unless the following conditions satisfy:

Δy=−T, when some samples {R(x+BVx, y+(BVy+H)) |x∈{0, W−1}, y∈{0,T−1}} overlap invalid area;

Δx=T, when some samples {R(x+BVx, y+BVy)|x∈{−T,−1}, y∈{0,H−1} } overlap invalid area.

Equivalently, these cost functions can be re-formulated to flip current templates instead of flipping reference ones to compute TM cost, as follows, with the same aforementioned derivation processes for Δx and Δy:

$$\text{Cost}_{None2}=\text{Cost}_{None1}$$

$$\begin{aligned}\text{Cost}_{Hor2}&=\sum_{x\in\{0,\ldots,W-1\},y\in\{-T,\ldots,-1\}}w((W-1-x),\ y)*\\&\quad|C((W-1-x),\ y)-R(x+BVx,\ y+BVy+\Delta y)|+\\&\quad\sum_{x\in\{0,\ldots,T-1\},y\in\{0,\ldots,H-1\}}w((-1-x),\ y)*\\&\quad|C((-1-x),\ y)-R(x+(BVx+\Delta x+W),\ y+BVy)|\\&=\text{Cost}_{Hor1}\end{aligned}$$

$$\begin{aligned}\text{Cost}_{Ver2}&=\sum_{x\in\{0,\ldots,W-1\},y\in\{0,\ldots,T-1\}}w(x,\ (-1-y))*\\&\quad|C(x,\ (-1-y))-R(x+BVx,\ y+(BVy+\Delta y+H))|+\\&\quad\sum_{x\in\{-T,\ldots,-1\},y\in\{0,\ldots,H-1\}}w(x,\ (H-1-y))*\\&\quad|C(x,\ (H-1-y))-R(x+BVx+\Delta x,\ y+BVy)|\\&=\text{Cost}_{Ver1}.\end{aligned}$$

In some examples, video encoder 200 and video decoder 300 may reuse the TM search process of RR-IBC reuses that of Inter template matching and thus the same hardware module can be re-used. For example, ECM applies an iterative 2-step diamond search, followed by an iterative 1-step cross search.

In some examples, video encoder 200 and video decoder 300 may use a TM search process of RR-IBC, which may be full-search or iterative square search.

In some examples, video encoder 200 and video decoder 300 may use a TM search process of RR-IBC that is a 1-D search. For horizontal mode, the search may be performed toward the 1-D direction to the left or to the right relative to where the inferred BV points to, and thus, only the x component of the inferred BV would be updated by TM. Similarly, for vertical mode, the search may be toward the 1-D direction to the above or to the bottom relative to where the inferred BV points to, and thus, only the y component of the inferred BV would be updated by TM.

In some examples, the TM search process of RR-IBC could be an iterative one-dimensional (1D) search. Starting from where the inferred BV points, video encoder 200 or video decoder 300 may perform a search process of horizontal mode leftward and rightward first, once for each side. Then, if "leftward" is better than "rightward," video encoder 200 or video decoder 300 may perform the search process only search leftward until the search process stops. Otherwise, if "rightward" is better, video encoder 200 or video decoder 300 may perform the search process only rightward until the search process stops.

Similarly, starting from where the inferred BV points, video encoder 200 or video decoder 300 may perform the search process of vertical mode upward and downward first, once for each side. Then, if "upward" is better than "downward," video encoder 200 or video decoder 300 may perform the search process only upward until the search process stops. Otherwise, if "downward" is better, video encoder 200 or video decoder 300 may perform the process only downward until the search process stops.

In some examples, video decoder 300 receives a block vector difference (BVD) and adds the BVD to the IntraTMP BV to form the final BV. Likewise, video encoder 200 may calculate and encode the BVD.

In some examples, video decoder 300 may support multiple resolutions of BVD to be signaled in bitstream. For example, the same design as IBC may be used, which supports 1-pel and 4-pel options in ECM. The 1-pel and 4-pel options may be differentiated by a mode flag that video decoder 300 may receive and decode (and that video encoder 200 may encode). When the mode flag indicates that 4-pel is used, then video decoder 300 may left-shift the BVD by 2 bits before adding the BVD to IntraTMP BV to form the final BV. In some examples, the BVD may have sub-pixel resolutions, such as 1/16 pixel, 1/8 pixel, 1/4 pixel, or 1/2 pixel resolution.

In some examples, video encoder 200 and video decoder 300 may form the BV (either purely derived by IntraTMP or the final BV formed by adding IntraTMP BV and BVD) and insert the BV into IBC's history-based motion vector prediction (HMVP) list. Thus, when coding subsequent IntraTMP and IBC blocks, video encoder 200 and video decoder 300 may infer them for BV prediction.

In some examples, IntraTMP is harmonized with IBC design. The IntraTMP BV may be a BV predictor and be inserted it into IBC's AMVP or merge candidate list. The BV can be inserted at the first entry of the whole candidate list, at the first entry after spatial candidates, or at the first entry after HMVP candidates. Thus, there is no need for a CU-level mode flag to indicate the use of IntraTMP at CU level. Instead, the mode may be indicated by using IBC's AMVP index or IBC's merge index.

In addition, in some examples, a CU size constraint may apply to restrict the use of IntraTMP. For example, IntraTMP's BV may be inserted into IBC's AMVP and merge candidates lists only when both the CU width and height are at most N, where N is a power-of-2 number (e.g., 128, 64, or 32).

In addition to the above, when a sequence parameter set (SPS) flag for IntraTMP enables IntraTMP and an SPS flag for IBC disables IBV, video encoder 200 and video decoder 300 may forcefully enable IBC (which infers the SPS flag of IBC to be true) and set the respective numbers of IBC's AMVP and merge candidates to be 1 (i.e., not necessary to signal this "1"). In this special case, there may be two properties in syntax signaling, as follows:

The CU-level flag of IBC mode need not be signaled in bitstream, when CU size does not satisfy the CU size constraint specified above.

When IBC AMVP mode is used, since there is only one AMVP in the candidate list, the AMVP index need not be signaled and is always set equal to 0.

Figure 12:
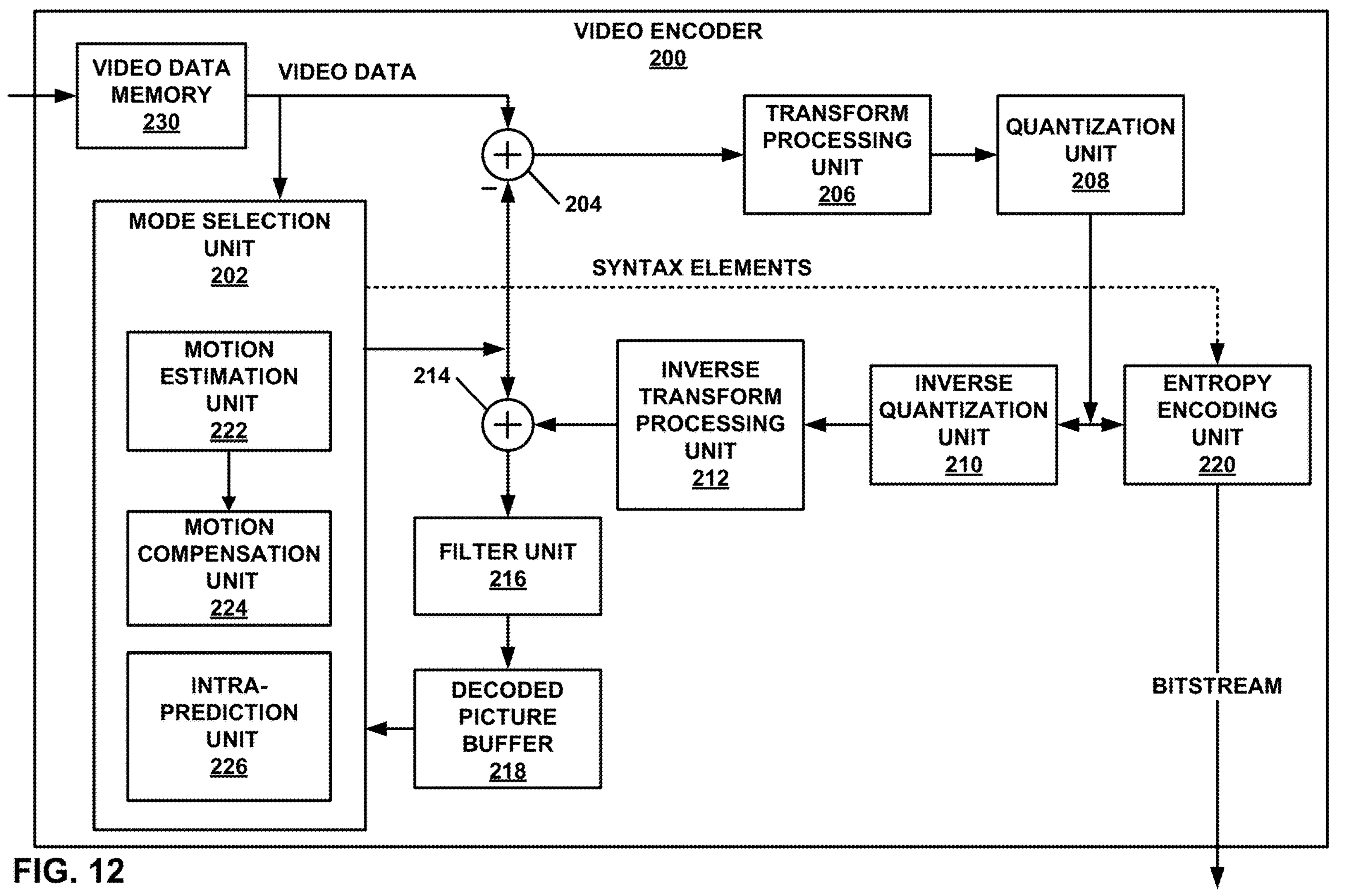
FIG. 12 is a block diagram illustrating an example video encoder that may perform the techniques of this disclosure.

FIG. 12 is a block diagram illustrating an example video encoder 200 that may perform the techniques of this disclosure. FIG. 12 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 12, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 12 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Motion estimation unit 222 and motion compensation unit 224 may also be configured to perform intra-block copy (IBC) prediction for a block. In general, rather than performing a search in a previously coded picture, the motion search for IBC is in the same picture as the current block. Motion estimation unit 222 may form a block vector instead of a motion vector in this case, as discussed above. Motion compensation unit 224 may be configured to perform the template matching techniques of this disclosure as discussed above, alone or in any combination.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Furthermore, intra-prediction unit 226 may perform intra-block copy (IBC) prediction mode. According to the techniques of this disclosure, intra-prediction unit 226 may determine an actual block vector (also referred to herein as a "displacement vector") for a current block, which identifies a reference block to be used to generate a prediction block for the current block. Moreover, intra-prediction unit 226 may encode the actual block vector using predictive encoding. For example, per the techniques of this disclosure, intra-prediction unit 226 may first form a predictor block vector using IntraTMP as discussed above. Intra-prediction unit 226 may then calculate a block vector difference (BVD) value representing a difference between the actual block vector and the predictor block vector. Intra-prediction unit 226 may then provide the BVD value to entropy encoding unit 220, along with information indicating that the current block is to be predicted using IBC.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Furthermore, intra-prediction unit 318 may perform intra-block copy (IBC) prediction mode. According to the techniques of this disclosure, intra-prediction unit 318 may reconstruct an actual block vector (also referred to herein as a "displacement vector") for a current block, which identifies a reference block to be used to generate a prediction block for the current block. To reconstruct the actual block vector, entropy decoding unit 302 may decode a block vector difference (BVD) value, and intra-prediction unit 318 may receive the BVD decoded by entropy decoding unit 302. Per the techniques of this disclosure, intra-prediction unit 318 may form a predictor block vector using IntraTMP as discussed above. Intra-prediction unit 318 may then apply the BVD value to the predictor block value to reconstruct the actual block vector for the current block. Finally, intra-prediction unit 318 may use the actual block vector to generate a prediction block for the current block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In this manner, video encoder 200 represents an example of a device for decoding video data including a memory configured to store video data; and a processing system implemented in circuitry and configured to: form a block vector difference (BVD) value for a current block of video data; determine an initial block vector for the current block of video data using intra template matching prediction (IntraTMP); apply the BVD value to the initial block vector to form a final block vector for the current block of video data; and decode the current block using the final block vector.

Figure 13:
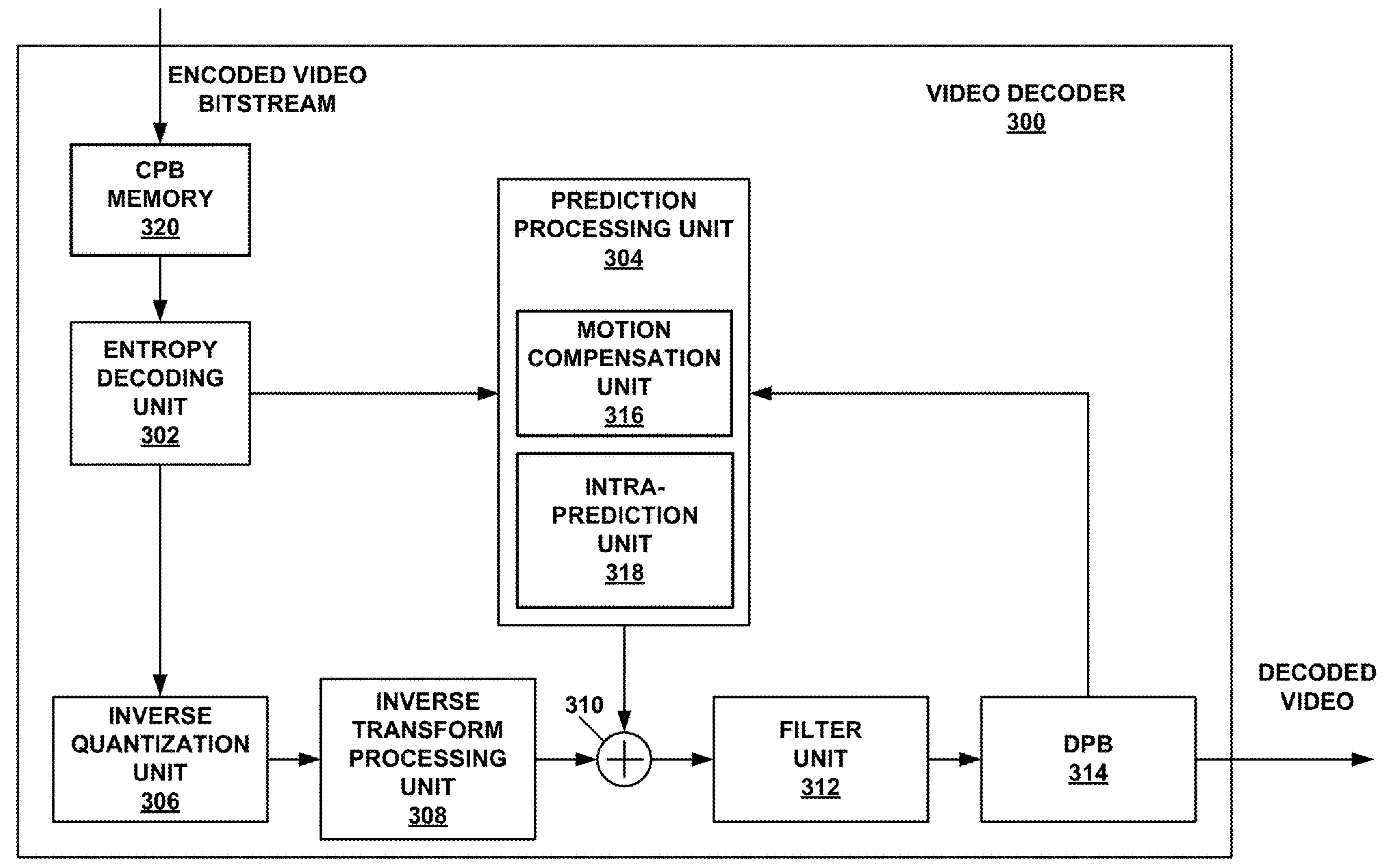
FIG. 13 is a block diagram illustrating an example video decoder that may perform the techniques of this disclosure.

FIG. 13 is a block diagram illustrating an example video decoder 300 that may perform the techniques of this disclosure. FIG. 13 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 13, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

Motion compensation unit 224 may also be configured to perform intra-block copy (IBC) prediction for a block according to the techniques of this disclosure. In general, entropy decoding unit 302 may decode a block vector for a current block predicted using IBC. Motion compensation unit 316 may be configured to perform the template matching techniques of this disclosure as discussed above, alone or in any combination, to refine the BV and to form a prediction block for the current block.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 13 are illustrated to assist with understanding the operations performed by video decoder 300. The units may be implemented as fixed-function circuits, programmable circuits, or a combination thereof. Similar to FIG. 12, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 12).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 12). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a device for decoding video data including a memory configured to store video data; and a processing system implemented in circuitry and configured to: decode a block vector difference (BVD) value for a current block of video data; determine an initial block vector for the current block of video data using intra template matching prediction (IntraTMP); apply the BVD value to the initial block vector to form a final block vector for the current block of video data; and decode the current block using the final block vector.

Figure 14:
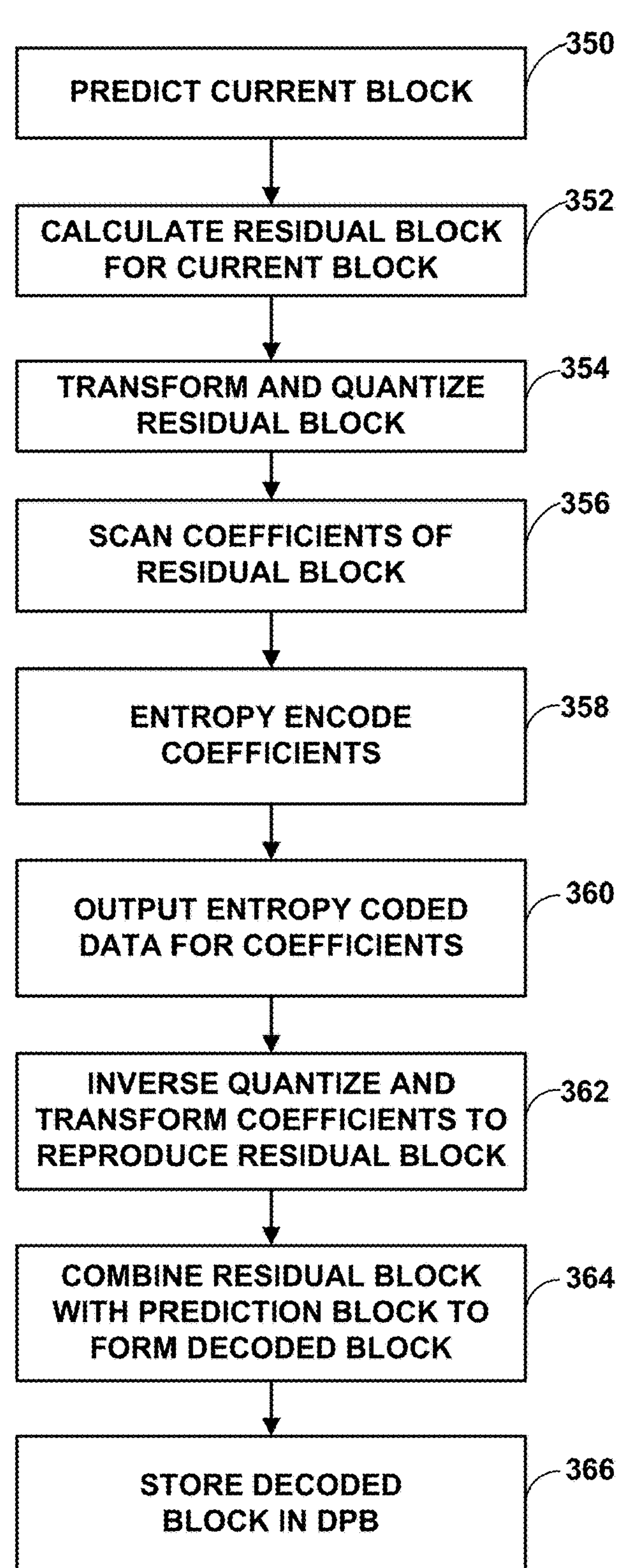
FIG. 14 is a flowchart illustrating an example method for encoding a current block in accordance with the techniques of this disclosure.

FIG. 14 is a flowchart illustrating an example method for encoding a current block in accordance with the techniques of this disclosure. The current block may comprise a current CU. Although described with respect to video encoder 200 (FIGS. 1 and 12), it should be understood that other devices may be configured to perform a method similar to that of FIG. 14.

In this example, video encoder 200 initially predicts the current block (350). For example, video encoder 200 may form a prediction block for the current block. In particular, video encoder 200 may perform the techniques of this disclosure to form the prediction block (e.g., from an unflipped reference block or from a flipped reference block) using IBC. Moreover, video encoder 200 may encode the resulting actual block vector using a predictor block vector formed according to IntraTMP.

Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

In this manner, the method of FIG. 14 represents an example of a method of decoding video data including forming a block vector difference (BVD) value for a current block of video data; determining an initial block vector for the current block of video data using intra template matching prediction (IntraTMP); applying the BVD value to the initial block vector to form a final block vector for the current block of video data; and decoding the current block using the final block vector.

Figure 15:
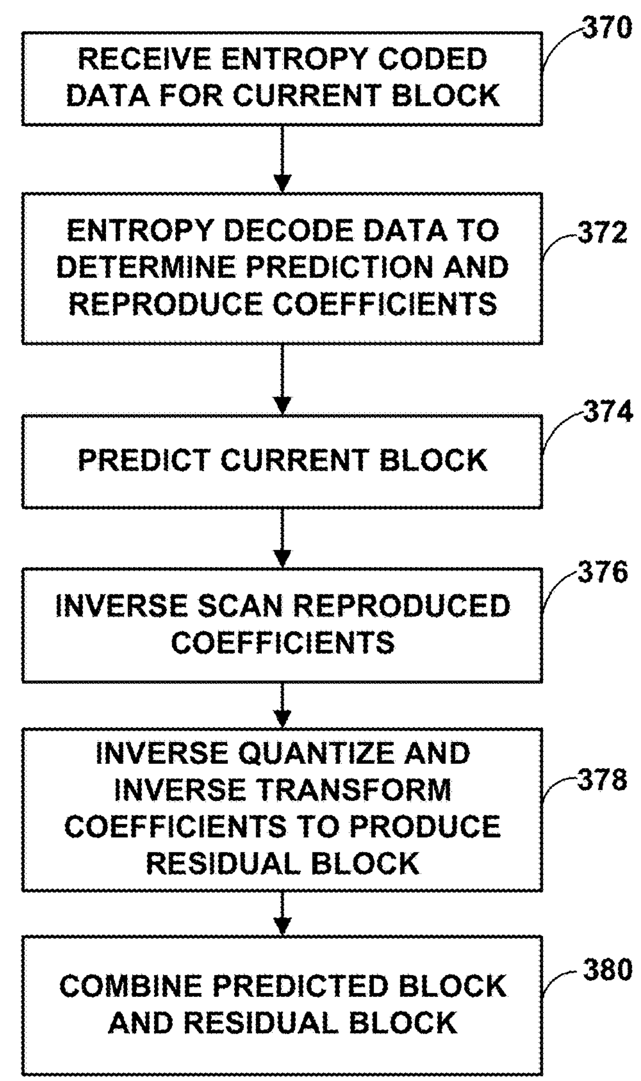
FIG. 15 is a flowchart illustrating an example method for decoding a current block in accordance with the techniques of this disclosure.

FIG. 15 is a flowchart illustrating an example method for decoding a current block of video data in accordance with the techniques of this disclosure. The current block may comprise a current CU. Although described with respect to video decoder 300 (FIGS. 1 and 13), it should be understood that other devices may be configured to perform a method similar to that of FIG. 15.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374). In particular, video decoder 300 may perform the techniques of this disclosure to form a prediction block (from an unflipped reference block or from a flipped reference block) using IBC according to a block vector. To decode the block vector, according to the techniques of this disclosure, video decoder 300 may decode an encoded block vector difference (BVD) value, perform IntraTMP to generate a predictor block vector, then apply the BVD value to the predictor block vector.

Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

In this manner, the method of FIG. 15 represents an example of a method of decoding video data including decoding a block vector difference (BVD) value for a current block of video data; determining an initial block vector for the current block of video data using intra template matching prediction (IntraTMP); applying the BVD value to the initial block vector to form a final block vector for the current block of video data; and decoding the current block using the final block vector.

Figure 16:
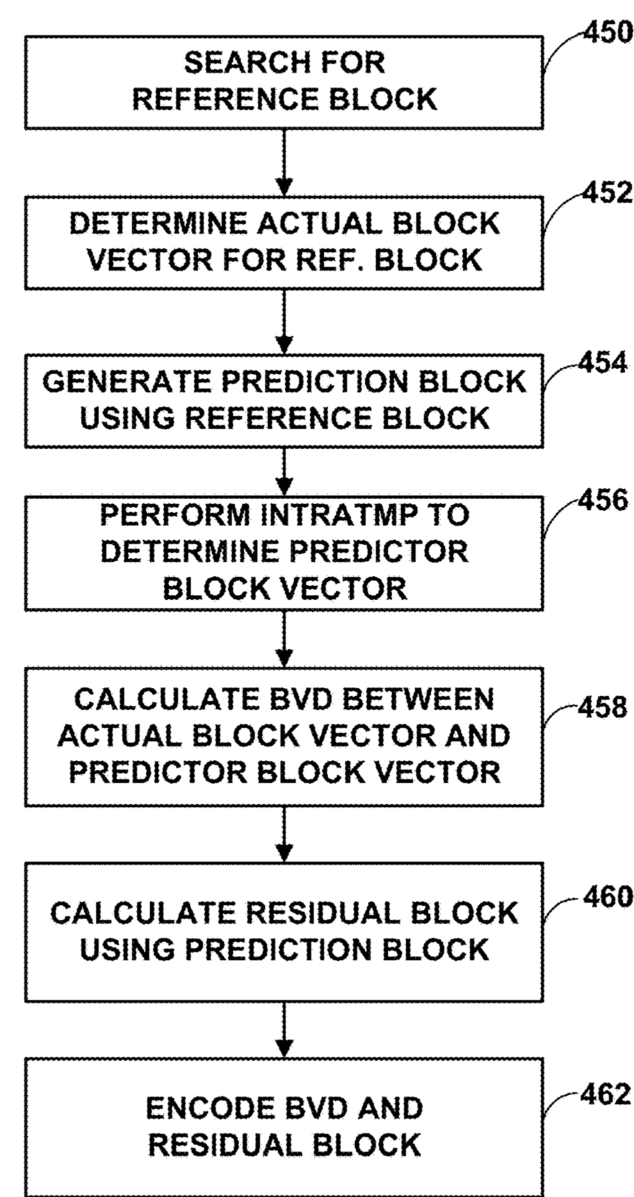
FIG. 16 is a flowchart illustrating an example method for encoding a block of video data using intra block copy (IBC) and for encoding an IBC block vector using an IntraTMP-generated predictor block vector according to the techniques of this disclosure.

FIG. 16 is a flowchart illustrating an example method for encoding a block of video data using intra block copy (IBC) and for encoding an IBC block vector using an IntraTMP-generated predictor block vector according to the techniques of this disclosure. Initially, video encoder 200 may determine that a current block of video data should be predicted using IBC mode, e.g., by comparing rate-distortion values for various prediction modes and determining that IBC mode yields the best tested rate-distortion value.

Thus, per IBC mode, video encoder 200 may search for a reference block (450). That is, video encoder 200 may search a previously encoded region of a current picture including the current block for a reference block (450), where the region may include one or more of the regions as shown in FIG. 6 above. The reference block may correspond to a best-matching block to the current block in the searched region, e.g., as measured using SAD, SSD, MAD, MSD, or other such difference metrics.

Video encoder 200 may then determine an actual block vector referring to the reference block (452). In particular, per IBC mode, the actual block vector may refer to the position in the current picture corresponding to the reference block relative to the position of the current block. Video encoder 200 may then generate a prediction block using the reference block (454).

Video encoder 200 may then perform IntraTMP to determine a predictor block vector for the current block (456). For example, video encoder 200 may compare one or more templates neighboring the current block to templates in the search region of the current block to identify those templates that best match the templates neighboring the current block. Video encoder 200 may then form a block vector referencing the templates in the region that best match the templates neighboring the current block, and use this block vector as the predictor block vector.

Video encoder 200 may then calculate a BVD between the actual block vector and the predictor block vector (458). The BVD may represent a difference along the horizontal and/or vertical directions and have a magnitude expressed in pixels, e.g., 1, 2, 4, 8, 12, 16 etc., as discussed above with respect to IBC-MBVD.

Video encoder 200 may calculate a residual block using the prediction block (460). As explained above, the residual block represents sample-by-sample differences between the current block and the prediction block. Video encoder 200 may then encode the BVD and the residual block (462). For example, to encode the BVD, video encoder 200 may determine an index value that references the calculated BVD (magnitude and direction) from a list of possible BVD values, then encode the index value. To encode the residual block, video encoder may transform and quantize the residual block, then entropy encode the resulting quantized transform coefficients.

Figure 17:
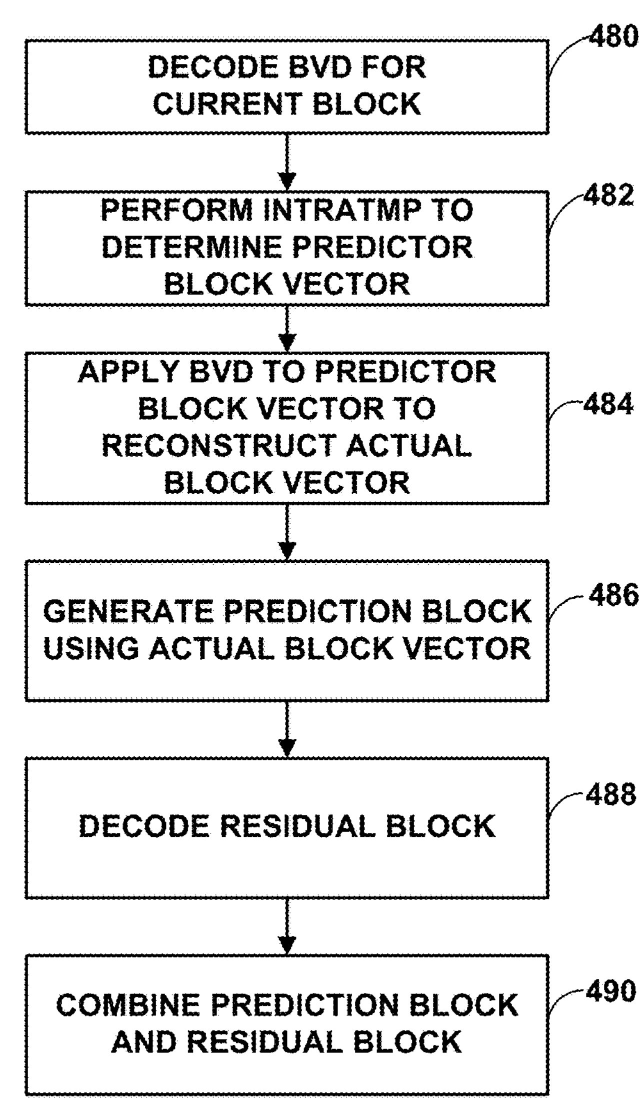
FIG. 17 is a flowchart illustrating an example method for decoding a block of video data using intra block copy (IBC) and for decoding an IBC block vector using an IntraTMP-generated predictor block vector according to the techniques of this disclosure.

FIG. 17 is a flowchart illustrating an example method for decoding a block of video data using intra block copy (IBC) and for decoding an IBC block vector using an IntraTMP-generated predictor block vector according to the techniques of this disclosure. Initially, video decoder 300 may decode a block vector difference (BVD) value for a current block (480). The BVD value may be included in prediction mode information for the current block, which may also indicate that the current block is to be predicted using IBC, and that a predictor for a block vector for the current block is to be determined using IntraTMP. The decoded BVD value may be an index into a set of potential BVD values, e.g., magnitudes and offset directions (horizontal and/or vertical).

Accordingly, video decoder 300 may perform IntraTMP to determine the predictor block vector for the current block (482). As discussed above, video decoder 300 may compare one or more templates neighboring the current block to templates in the search region of the current block to identify those templates that best match the templates neighboring the current block. Video decoder 300 may then form a block vector referencing the templates in the region that best match the templates neighboring the current block, and use this block vector as the predictor block vector.

Video decoder 300 may then apply the BVD to the predictor block vector to reconstruct an actual block vector for the current block (484). For example, if the BVD indicates an offset along a particular direction of a particular magnitude, video decoder 300 may offset the predictor block vector according to the BVD to reconstruct the actual block vector.

Video decoder 300 may then generate a prediction block using the actual block vector (486). Video decoder 300 may further decode a residual block for the current block (488). For example, video decoder 300 may entropy decode quantized transform coefficients from the bitstream, then inverse quantize and inverse transform the coefficients to reconstruct the residual block. Video decoder 300 may then combine the prediction block and the residual block, on a pixel-by-pixel (or sample-by-sample) basis to ultimately reconstruct the current block.

In this manner, the method of FIG. 17 represents an example of a method of decoding video data including decoding a block vector difference (BVD) value for a current block of video data; determining an initial block vector for the current block of video data using intra template matching prediction (IntraTMP); applying the BVD value to the initial block vector to form a final block vector for the current block of video data; and decoding the current block using the final block vector.

The following clauses summarize various examples of the techniques of this disclosure:

Clause 1. A method of decoding video data, the method comprising: determining that a block of video data is a reconstruction-reordered intra-block copy (RR-IBC) block; determining a block vector for the block; determining that a reference block referred to by the block vector is flipped according to a flip mode; calculating a template matching cost according to a current neighboring template to the block and a flipped neighboring reference template for the reference block, the flipped neighboring reference template being flipped according to the flip mode; refining the block vector using the template matching cost to form a refined block vector; and decoding the block using the refined block vector.

Clause 2. A method of decoding video data, the method comprising: determining that a block of video data is a reconstruction-reordered intra-block copy (RR-IBC) block and flipped according to a flip mode; determining a block vector for the block; calculating a template matching cost according to a current neighboring template to the block and a flipped neighboring reference template for a reference block referred to by the block vector, the flipped neighboring reference template being flipped according to the flip mode; refining the block vector using the template matching cost to form a refined block vector; and decoding the block using the refined block vector.

Clause 3. The method of any of clauses 1 and 2, wherein refining the block vector using the template matching cost comprises: performing a motion search to form a plurality of motion vector prediction (MVP) candidates, the block vector being one of the MVP candidates; calculating template matching costs for each of the plurality of MVP candidates according to the current neighboring template to the block and flipped neighboring reference templates for reference blocks referred to by the MVP candidates, each of the flipped neighboring reference templates being flipped according to the flip mode; and selecting one of the MVP candidates having a lowest template matching cost as the refined block vector.

Clause 4. The method of clause 3, wherein performing the motion search comprises performing the motion search as an iterative two-step diamond search followed by an iterative one-step cross search.

Clause 5. The method of clause 3, wherein performing the motion search comprises performing the motion search as a full search.

Clause 6. The method of clause 3, wherein performing the motion search comprises performing the motion search as an iterative square search.

Clause 7. The method of clause 3, wherein performing the motion search comprises performing the motion search as a one-dimensional search according to the flip mode.

Clause 8. The method of any of clauses 1-7, wherein calculating the template match cost comprises: when the flip mode is horizontal flip mode, calculating the template match cost according to: $\Sigma_{x\in\{0, \ldots, W-1\}, y\in\{-T, \ldots, -1\}} w(x, y)*|C(x, y)-R((W-1-x)+BVx, y+BVy)|+\Sigma_{x\in\{-T, \ldots, -1\}, y\in\{0, \ldots, H-1\}} W(x, y)*|C(x, y)-R((-1-x)+(BVx+W), y+BVy)|$, or when the flip mode is vertical flip mode, calculating the template match cost according to: $\Sigma_{x\in\{0, \ldots, W-1\}, y\in\{-T, \ldots, -1\}} w(x, y)*|C(x, y)-R(x+BVx, (-1-y)+(BVy+H)|+\Sigma_{x\in\{-T, \ldots, -1\}, y\in\{0, \ldots, H-1\}} w(X, y)*|C(x, y)-R(x+BVx, (H-1-y)+BVy)|$, wherein the current neighboring template and the flipped neighboring reference template have a size of T, the block has a size of W×H, C(x, y) represents a value of a reconstructed sample of the current neighboring template at position (x, y), BV represents an offset according to the block vector, R(x, y) represents a value of a reconstructed sample of the flipped neighboring reference template, x represents a horizontal component of the position, and y represents a vertical component of the position.

Clause 9. The method of any of clauses 1-7, wherein calculating the template match cost comprises: when the flip mode is horizontal flip mode, calculating the template match cost according to: $\Sigma_{x\in\{0, \ldots, W-1\}, y\in\{-T, \ldots, -1\}} w((W-1-x), y)*|((W-1-x), y)-R(x+BVx, y+BVy)|+\Sigma_{x\in\{-T, \ldots, -1\}, y\in\{0, \ldots, H-1\}} w((-1-x), y)*|C((-1-x), y)-R(x+(BVx+W), y+BVy)|$, or when the flip mode is vertical flip mode, calculating the template match cost according to: $\Sigma_{x\in\{0, \ldots, W-1\}, y\in\{-T, \ldots, -1\}} w(x, (-1-y))*|C(x, (-1-y))-R(x+BVx, y+(BVy+H)|+\Sigma_{x\in\{-T, \ldots, -1\}, y\in\{0, \ldots, H-1\}} w(x, (H-1-y)*| C(x, (H-1-y)-R(x+BVx, y+BVy)|$, wherein the current neighboring template and the flipped neighboring reference template have a size of T, the block has a size of W×H, C(x, y) represents a value of a reconstructed sample of the current neighboring template at position (x, y), BV represents an offset according to the block vector, R(x, y) represents a value of a reconstructed sample of the flipped neighboring reference template, x represents a horizontal component of the position, and y represents a vertical component of the position.

Clause 10. The method of any of clauses 1-7, wherein calculating the template match cost comprises: when the flip mode is horizontal flip mode, calculating the template match cost according to: $\Sigma_{x\in\{0, \ldots, W-1\}, y\in\{-T, \ldots, -1\}}|C(x, y)-R((W-1-x)+BVx, y+BVy+\Delta y)|+\Sigma_{x\in\{-T, \ldots, -1\}, y\in\{0, \ldots, H-1\}}|C(x,y)-R((-1-x)+(BVx+\Delta x+W), y+BVy)|$, or when the flip mode is vertical flip mode, calculating the template match cost according to: $\Sigma_{x\in\{0, \ldots, W-1\}, y\in\{-T, \ldots, -1\}}| C(x, y)-R(x+BVx, (-1-y)+(BVy+\Delta y+H)|+\Sigma_{x\in\{-T, \ldots, -1\}, y\in\{0, \ldots, H-1\}}|C(x, y)-R(x+BVx+\Delta x, (H-1-y)+BVy)|$, wherein the current neighboring template and the flipped neighboring reference template have a size of T, the block has a size of W×H, C(x, y) represents a value of a reconstructed sample of the current neighboring template at position (x, y), BV represents an offset according to the block vector, Δx represents a horizontal offset to be applied to BV, Δy represents a vertical offset to be applied to BV, R(x, y) represents a value of a reconstructed sample of the flipped neighboring reference template, x represents a horizontal component of the position, and y represents a vertical component of the position, the method further comprising: when a reference sample identified by BV is in an invalid area, determining that a value for Δy is −T or that a value for Δx is T, or when the reference sample identified by BV is not in the invalid area, determining that the value for Δy is 0 or that the value for Δx is 0.

Clause 11. The method of any of clauses 1-10, wherein calculating the template match cost comprises assigning each sample of the current neighboring template a sample-adaptive weight value according to a region of the current neighboring template that includes the sample.

Clause 12. The method of any of clauses 1-11, wherein refining the block vector further comprises: decoding a block vector difference (BVD); and applying the BVD to form the refined block vector.

Clause 13. The method of clause 12, wherein the BVD has a resolution of one of single pixel, two pixels, or four pixels.

Clause 14. The method of any of clauses 12 and 13, further comprising using the refined block vector as a candidate motion vector predictor for a subsequent block.

Clause 15. The method of any of clauses 12 and 13, further comprising using the block vector as a candidate motion vector predictor for a subsequent block.

Clause 16. The method of any of clauses 12 and 13, further comprising using the refined block vector as an intra template matching prediction (IntraTMP) candidate motion vector predictor for a subsequent block.

Clause 17. The method of any of clauses 12 and 13, further comprising using the block vector as an intra template matching prediction (IntraTMP) candidate motion vector predictor for a subsequent block.

Clause 18. The method of any of clauses 12 and 13, further comprising using the refined block vector as an intra block copy advanced motion vector prediction (IBC AMVP) candidate motion vector predictor for a subsequent block.

Clause 19. The method of any of clauses 12 and 13, further comprising using the block vector as an intra block copy advanced motion vector prediction (IBC AMVP) candidate motion vector predictor for a subsequent block.

Clause 20. The method of any of clauses 12 and 13, further comprising using the refined block vector as an intra block copy (IBC) merge mode candidate motion vector predictor for a subsequent block.

Clause 21. The method of any of clauses 12 and 13, further comprising using the block vector as an intra block copy (IBC) merge mode candidate motion vector predictor for a subsequent block.

Clause 22. The method of clause 1, wherein calculating the template match cost comprises: when the flip mode is horizontal flip mode, calculating the template match cost according to: $\Sigma_{x\in\{0, \ldots, W-1\}, y\in\{-T, \ldots, -1\}} |C(x, y)-R((W-1-x)+BVx, y+BVy)|+\Sigma_{x\in\{-T, \ldots, -1\}, y\in(\{0, \ldots, H-1\}}w(x, y)*|C(x, y)-R((-1-x)+(BVx+W), y+BVy)|$, or when the flip mode is vertical flip mode, calculating the template match cost according to: $\Sigma_{x\in\{0, \ldots W-1\}, y\in\{-T, \ldots, -1\}}w(x, y)* |C(x, y)-R(x+BVx, (-1-y)+(BVy+H))|+\Sigma_{x\in\{-T, \ldots, -1\}, y\in\{0, \ldots, H-1\}}w(x, y)*|C(x, y)-R(x+BVx, (H-1-y)+BVy)|$, wherein the current neighboring template and the flipped neighboring reference template have a size of T, the block has a size of W×H, C(x, y) represents a value of a reconstructed sample of the current neighboring template at position (x, y), BV represents an offset according to the block vector, R(x, y) represents a value of a reconstructed sample of the flipped neighboring reference template, x represents a horizontal component of the position, and y represents a vertical component of the position.

Clause 23. The method of clause 1, wherein calculating the template match cost comprises: when the flip mode is horizontal flip mode, calculating the template match cost according to: $\Sigma_{x\in\{0, \ldots, W-1\}, y\in\{-T, \ldots, -1\}}|w((W-1-x), y)*|C((W-1-x), y)-R(x+BVx, y+BVy)|+\Sigma_{x\in\{0, \ldots, T-1\}, y\in\{0, \ldots, H-1\}}w((-1-x), y)*|C((-1-x), y)-R(x+(BVx+W), y+BVy)|$, or when the flip mode is vertical flip mode, calculating the template match cost according to: $\Sigma_{x\in\{0, \ldots, W-1\} y\in\{0, \ldots, T\text{-}1\}}w(x, (-1-y))*|C(x, (-1-y))-R(x+BVx, y+(BVy+H))| \Sigma_{x\in(\{-T, \ldots, -1\}, y\in\{0, \ldots, H-1\}}w(x, (H-1-y))*|C(x, (H-1-y))-R(x+BVx, y+BVy)|$, wherein the current neighboring template and the flipped neighboring reference template have a size of T, the block has a size of W×H, C(x, y) represents a value of a reconstructed sample of the current neighboring template at position (x, y), BV represents an offset according to the block vector, R(x, y) represents a value of a reconstructed sample of the flipped neighboring reference template, x represents a horizontal component of the position, and y represents a vertical component of the position.

Clause 24. The method of clause 1, wherein calculating the template match cost comprises: when the flip mode is horizontal flip mode, calculating the template match cost according to: $\Sigma_{x\in\{0, \ldots, W-1\}, y\in\{-T, \ldots, -1\}}| C(x, y)-R((W-1-x)+BVx, y+BVy+\Delta y)|+\Sigma_{x\in\{-T, \ldots, -1\}, y\in\{0, \ldots, H-1\}}|C(x, y)-R((-1-x)+(BVx+\Delta x+W), y+BVy)|$, or when the flip mode is vertical flip mode, calculating the template match cost according to: $\Sigma_{x\in\{0, \ldots, W-1\}, y\in\{-T, \ldots, -1\}}|C(x, y)-R(x+BVx, (-1-y)+(BVy+\Delta y+H))|+\Sigma_{x\in\{-T, \ldots, -1\}, y\in\{0, \ldots, H-1\}}|C(x, y)-R(x+BVx+\Delta x, (H-1-y)+BVy)|$, wherein the current neighboring template and the flipped neighboring reference template have a size of T, the block has a size of W×H, C(x, y) represents a value of a reconstructed sample of the current neighboring template at position (x, y), BV represents an offset according to the block vector, Δx represents a horizontal offset to be applied to BV, Δy represents a vertical offset to be applied to BV, R(x, y) represents a value of a reconstructed sample of the flipped neighboring reference template, x represents a horizontal component of the position, and y represents a vertical component of the position, the method further comprising: when a reference sample identified by BV is in an invalid area, determining that a value for Δy is −T or that a value for Δx is T, or when the reference sample identified by BV is not in the invalid area, determining that the value for Δy is 0 or that the value for Δx is 0.

Clause 25. The method of clause 1, wherein calculating the template match cost comprises assigning each sample of the current neighboring template a sample-adaptive weight value according to a region of the current neighboring template that includes the sample.

Clause 26. The method of clause 1, wherein refining the block vector further comprises: decoding a block vector difference (BVD); and applying the BVD to form the refined block vector.

Clause 27. The method of clause 26, wherein the BVD has a resolution of one of single pixel, two pixels, or four pixels.

Clause 28. The method of clause 26, further comprising using the refined block vector as a candidate motion vector predictor for a subsequent block.

Clause 29. The method of clause 26, further comprising using the block vector as a candidate motion vector predictor for a subsequent block.

Clause 30. The method of clause 26, further comprising using the refined block vector as an intra template matching prediction (IntraTMP) candidate motion vector predictor for a subsequent block.

Clause 31. The method of clause 26, further comprising using the block vector as an intra template matching prediction (IntraTMP) candidate motion vector predictor for a subsequent block.

Clause 32. The method of clause 26, further comprising using the refined block vector as an intra block copy advanced motion vector prediction (IBC AMVP) candidate motion vector predictor for a subsequent block.

Clause 33. The method of clause 26, further comprising using the block vector as an intra block copy advanced motion vector prediction (IBC AMVP) candidate motion vector predictor for a subsequent block.

Clause 34. The method of clause 26, further comprising using the refined block vector as an intra block copy (IBC) merge mode candidate motion vector predictor for a subsequent block.

Clause 35. The method of clause 26, further comprising using the block vector as an intra block copy (IBC) merge mode candidate motion vector predictor for a subsequent block.

Clause 36. The method of clause 1 or 2, further comprising encoding the block prior to decoding the block.

Clause 37. The method of any of clauses 1-35, further comprising encoding the current block prior to decoding the current block.

Clause 38. A device for decoding video data, the device comprising one or more means for performing the method of any of clauses 1-37.

39. The device of clause 38, further comprising a display configured to display the decoded video data.

Clause 40. The device of any of clauses 38-39, wherein the device comprises one or more of a camera, a computer, a mobile device, a broadcast receiver device, or a set-top box.

Clause 41. The device of clause 38-40, further comprising a memory configured to store the video data.

Clause 42. A computer-readable storage medium having stored thereon instructions that, when executed, cause a processor of a device for decoding video data to perform the method of any of clauses 1-37.

Clause 43. A device for decoding video data, the device comprising: means for determining that a block of video data is a reconstruction-reordered intra-block copy (RR-IBC) block; means for determining a block vector for the block; means for determining that a reference block referred to by the block vector is flipped according to a flip mode; means for calculating a template matching cost according to a current neighboring template to the block and a flipped neighboring reference template for the reference block, the flipped neighboring reference template being flipped according to the flip mode; means for refining the block vector using the template matching cost to form a refined block vector; and means for decoding the block using the refined block vector.

Clause 44: A method of decoding video data, the method comprising: decoding a block vector difference (BVD) value for a current block of video data; determining an initial block vector for the current block of video data using intra template matching prediction (IntraTMP); applying the BVD value to the initial block vector to form a final block vector for the current block of video data; and decoding the current block using the final block vector.

Clause 45: The method of clause 44, wherein the BVD has a resolution of one of single pixel, two pixels, or four pixels.

Clause 46: The method of any of clauses 44 and 45, further comprising using the final block vector as a candidate motion vector predictor for a subsequent block.

Clause 47: The method of any of clauses 44 and 45, further comprising using the initial block vector as a candidate motion vector predictor for a subsequent block.

Clause 48: The method of any of clauses 44-47, further comprising using the final block vector as an IntraTMP candidate motion vector predictor for a subsequent block.

Clause 49: The method of any of clauses 44-47, further comprising using the initial block vector as an IntraTMP candidate motion vector predictor for a subsequent block.

Clause 50: The method of any of clauses 44-49, further comprising using the final block vector as an intra block copy advanced motion vector prediction (IBC AMVP) candidate motion vector predictor for a subsequent block.

Clause 51: The method of any of clauses 44-49, further comprising using the final block vector as an intra block copy advanced motion vector prediction (IBC AMVP) candidate motion vector predictor for a subsequent block.

Clause 52: The method of any of clauses 44-51, further comprising using the final block vector as an intra block copy (IBC) merge mode candidate motion vector predictor for a subsequent block.

Clause 53: The method of any of clauses 44-51, further comprising using the initial block vector as an intra block copy (IBC) merge mode candidate motion vector predictor for a subsequent block.

Clause 54: The method of any of clauses 44-53, further comprising determining that the current block of video data is a reconstruction-reordered intra-block copy (RR-IBC) block and is flipped according to a flip mode, wherein applying the BVD value to the initial block vector comprises: calculating a template matching cost according to a current neighboring template to the block and a flipped neighboring reference template for a reference block referred to by the initial block vector, the flipped neighboring reference template being flipped according to the flip mode; refining the initial block vector using the template matching cost to form a refined block vector; and applying the BVD value to the refined block vector to form the final block vector.

Clause 55: The method of clause 54, wherein refining the initial block vector using the template matching cost comprises: performing a motion search to form a plurality of motion vector prediction (MVP) candidates, the initial block vector being one of the MVP candidates; calculating template matching costs for each of the plurality of MVP candidates according to the current neighboring template to the block and flipped neighboring reference templates for reference blocks referred to by the MVP candidates, each of the flipped neighboring reference templates being flipped according to the flip mode; and selecting one of the MVP candidates having a lowest template matching cost as the refined block vector.

Clause 56: The method of clause 55, wherein performing the motion search comprises performing the motion search as one of an iterative two-step diamond search followed by an iterative one-step cross search; a full search; an iterative square search; or a one-dimensional search according to the flip mode.

Clause 57: The method of any of clauses 54-56, wherein calculating the template match cost comprises assigning each sample of the current neighboring template a sample-adaptive weight value according to a region of the current neighboring template that includes the sample.

Clause 58: The method of any of clauses 1-57, further comprising encoding the current block prior to decoding the current block.

Clause 59: A device for decoding video data, the device comprising: a memory configured to store video data; and a processing system implemented in circuitry and configured to: decode a block vector difference (BVD) value for a current block of video data; determine an initial block vector for the current block of video data using intra template matching prediction (IntraTMP); apply the BVD value to the initial block vector to form a final block vector for the current block of video data; and decode the current block using the final block vector.

Clause 60: The device of clause 59, wherein the BVD has a resolution of one of single pixel, two pixels, or four pixels.

Clause 61: The device of any of clauses 59 and 60, wherein the processing system is configured to use one of the initial block vector or the final block vector as a candidate motion vector predictor for a subsequent block.

Clause 62: The device of any of clauses 59-61, wherein the processing system is configured to use one of the initial block vector or the final block vector as an IntraTMP candidate motion vector predictor for a subsequent block.

Clause 63: The device of any of clauses 59-62, wherein the processing system is configured to use one of the initial block vector or the final block vector as an intra block copy advanced motion vector prediction (IBC AMVP) candidate motion vector predictor for a subsequent block.

Clause 64: The device of any of clauses 59-63, wherein the processing system is configured to use one of the initial block vector or the final block vector as an intra block copy advanced motion vector prediction (IBC AMVP) candidate motion vector predictor for a subsequent block.

Clause 65: The device of any of clauses 59-64, wherein the processing system is further configured to determine that the current block of video data is a reconstruction-reordered intra-block copy (RR-IBC) block and is flipped according to a flip mode, and wherein to apply the BVD value to the initial block vector, the processing system is configured to: calculate a template matching cost according to a current neighboring template to the block and a flipped neighboring reference template for a reference block referred to by the initial block vector, the flipped neighboring reference template being flipped according to the flip mode; refine the initial block vector using the template matching cost to form the refined block vector; and apply the BVD value to the refined block vector.

Clause 66: The device of clause 65, wherein refining the initial block vector using the template matching cost comprises: performing a motion search to form a plurality of motion vector prediction (MVP) candidates, the initial block vector being one of the MVP candidates; calculating template matching costs for each of the plurality of MVP candidates according to the current neighboring template to the block and flipped neighboring reference templates for reference blocks referred to by the MVP candidates, each of the flipped neighboring reference templates being flipped according to the flip mode; and selecting one of the MVP candidates having a lowest template matching cost as the refined block vector.

Clause 67: The device of clause 66, wherein performing the motion search comprises performing the motion search as one of an iterative two-step diamond search followed by an iterative one-step cross search; a full search; an iterative square search; or a one-dimensional search according to the flip mode.

Clause 68: The device of any of clauses 66 and 67, wherein calculating the template match cost comprises assigning each sample of the current neighboring template a sample-adaptive weight value according to a region of the current neighboring template that includes the sample.

Clause 69: The device of any of clauses 59-68, further comprising encoding the current block prior to decoding the current block.

Clause 70: The device of any of clauses 59-69, further comprising a display configured to display the decoded video data.

Clause 71: The device of any of clauses 59-70, wherein the device comprises one or more of a camera, a computer, a mobile device, a broadcast receiver device, or a set-top box.

Clause 72: A device for decoding video data, the device comprising: means for decoding a block vector difference (BVD) value for a current block of video data; means for determining an initial block vector for the current block of video data using intra template matching prediction (IntraTMP); means for applying the BVD value to the initial block vector to form a final block vector for the current block of video data; and means for decoding the current block using the final block vector.

Clause 73: A computer-readable storage medium having stored thereon instructions that, when executed, cause a processing system of a device for decoding video data to: decode a block vector difference (BVD) value for a current block of video data; determine an initial block vector for the current block of video data using intra template matching prediction (IntraTMP); apply the BVD value to the initial block vector to form a final block vector for the current block of video data; and decode the current block using the final block vector.

Clause 74: A method of decoding video data, the method comprising: decoding a block vector difference (BVD) value for a current block of video data; determining an initial block vector for the current block of video data using intra template matching prediction (IntraTMP); applying the BVD value to the initial block vector to form a final block vector for the current block of video data; and decoding the current block using the final block vector.

Clause 75: The method of clause 74, wherein the BVD has a resolution of one of single pixel, two pixels, or four pixels.

Clause 76: The method of clause 74, further comprising using the final block vector as a candidate motion vector predictor for a subsequent block.

Clause 77: The method of clause 74, further comprising using the initial block vector as a candidate motion vector predictor for a subsequent block.

Clause 78: The method of clause 74, further comprising using the final block vector as an IntraTMP candidate motion vector predictor for a subsequent block.

Clause 79: The method of clause 74, further comprising using the initial block vector as an IntraTMP candidate motion vector predictor for a subsequent block.

Clause 80: The method of clause 74, further comprising using the final block vector as an intra block copy advanced motion vector prediction (IBC AMVP) candidate motion vector predictor for a subsequent block.

Clause 81: The method of clause 74, further comprising using the final block vector as an intra block copy advanced motion vector prediction (IBC AMVP) candidate motion vector predictor for a subsequent block.

Clause 82: The method of clause 74, further comprising using the final block vector as an intra block copy (IBC) merge mode candidate motion vector predictor for a subsequent block.

Clause 83: The method of clause 74, further comprising using the initial block vector as an intra block copy (IBC) merge mode candidate motion vector predictor for a subsequent block.

Clause 84: The method of clause 74, further comprising determining that the current block of video data is a reconstruction-reordered intra-block copy (RR-IBC) block and is flipped according to a flip mode, wherein applying the BVD value to the initial block vector comprises: calculating a template matching cost according to a current neighboring template to the block and a flipped neighboring reference template for a reference block referred to by the initial block vector, the flipped neighboring reference template being flipped according to the flip mode; refining the initial block vector using the template matching cost to form the refined block vector; and applying the BVD value to the refined block vector.

Clause 85: The method of clause 84, wherein refining the initial block vector using the template matching cost comprises: performing a motion search to form a plurality of motion vector prediction (MVP) candidates, the initial block vector being one of the MVP candidates; calculating template matching costs for each of the plurality of MVP candidates according to the current neighboring template to the block and flipped neighboring reference templates for reference blocks referred to by the MVP candidates, each of the flipped neighboring reference templates being flipped according to the flip mode; and selecting one of the MVP candidates having a lowest template matching cost as the refined block vector.

Clause 86: The method of clause 85, wherein performing the motion search comprises performing the motion search as one of an iterative two-step diamond search followed by an iterative one-step cross search; a full search; an iterative square search; or a one-dimensional search according to the flip mode.

Clause 87: The method of any of clauses 84, wherein calculating the template match cost comprises assigning each sample of the current neighboring template a sample-adaptive weight value according to a region of the current neighboring template that includes the sample.

Clause 88: The method of clause 74, further comprising encoding the current block prior to decoding the current block.

Clause 89: A device for decoding video data, the device comprising: a memory configured to store video data; and a processing system implemented in circuitry and configured to: decode a block vector difference (BVD) value for a current block of video data; determine an initial block vector for the current block of video data using intra template matching prediction (IntraTMP); apply the BVD value to the initial block vector to form a final block vector for the current block of video data; and decode the current block using the final block vector.

Clause 90: The device of clause 89, wherein the BVD has a resolution of one of single pixel, two pixels, or four pixels.

Clause 91: The device of clause 89, wherein the processing system is configured to use one of the initial block vector or the final block vector as a candidate motion vector predictor for a subsequent block.

Clause 92: The device of clause 89, wherein the processing system is configured to use one of the initial block vector or the final block vector as an IntraTMP candidate motion vector predictor for a subsequent block.

Clause 93: The device of clause 89, wherein the processing system is configured to use one of the initial block vector or the final block vector as an intra block copy advanced motion vector prediction (IBC AMVP) candidate motion vector predictor for a subsequent block.

Clause 94: The device of clause 89, wherein the processing system is configured to use one of the initial block vector or the final block vector as an intra block copy advanced motion vector prediction (IBC AMVP) candidate motion vector predictor for a subsequent block.

Clause 95: The device of clause 89, wherein the processing system is further configured to determine that the current block of video data is a reconstruction-reordered intra-block copy (RR-IBC) block and is flipped according to a flip mode, and wherein to apply the BVD value to the initial block vector, the processing system is configured to: calculate a template matching cost according to a current neighboring template to the block and a flipped neighboring reference template for a reference block referred to by the initial block vector, the flipped neighboring reference template being flipped according to the flip mode; refine the initial block vector using the template matching cost to form the refined block vector; and apply the BVD value to the refined block vector to form the final block vector.

Clause 96: The device of clause 95, wherein refining the initial block vector using the template matching cost comprises: performing a motion search to form a plurality of motion vector prediction (MVP) candidates, the initial block vector being one of the MVP candidates; calculating template matching costs for each of the plurality of MVP candidates according to the current neighboring template to the block and flipped neighboring reference templates for reference blocks referred to by the MVP candidates, each of the flipped neighboring reference templates being flipped according to the flip mode; and selecting one of the MVP candidates having a lowest template matching cost as the refined block vector.

Clause 97: The device of clause 96, wherein performing the motion search comprises performing the motion search as one of an iterative two-step diamond search followed by an iterative one-step cross search; a full search; an iterative square search; or a one-dimensional search according to the flip mode.

Clause 98: The device of clause 96, wherein calculating the template match cost comprises assigning each sample of the current neighboring template a sample-adaptive weight value according to a region of the current neighboring template that includes the sample.

Clause 99: The device of clause 89, further comprising encoding the current block prior to decoding the current block.

Clause 100: The device of clause 89, further comprising a display configured to display the decoded video data.

Clause 101: The device of clause 89, wherein the device comprises one or more of a camera, a computer, a mobile device, a broadcast receiver device, or a set-top box.

Clause 102: A device for decoding video data, the device comprising: means for decoding a block vector difference (BVD) value for a current block of video data; means for determining an initial block vector for the current block of video data using intra template matching prediction (IntraTMP); means for applying the BVD value to the initial block vector to form a final block vector for the current block of video data; and means for decoding the current block using the final block vector.

Clause 103: A computer-readable storage medium having stored thereon instructions that, when executed, cause a processing system of a device for decoding video data to: decode a block vector difference (BVD) value for a current block of video data; determine an initial block vector for the current block of video data using intra template matching prediction (IntraTMP); apply the BVD value to the initial block vector to form a final block vector for the current block of video data; and decode the current block using the final block vector.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

decoding a block vector difference (BVD) value for a current block of video data, the current block of video data comprising a reconstruction-reordered intra-block copy (RR-IBC) block that is flipped according to a flip mode;

determining an initial block vector for the current block of video data using intra template matching prediction (IntraTMP);

applying the BVD value to the initial block vector to form a final block vector for the current block of video data, including:

calculating a template matching cost according to a current neighboring template to the current block and a flipped neighboring reference template for a reference block referred to by the initial block vector, the flipped neighboring reference template being flipped according to the flip mode;

refining the initial block vector using the template matching cost to form a refined block vector; and applying the BVD value to the refined block vector to form the final block vector;

decoding the current block using the final block vector;

inserting, into a history-based motion vector prediction (HMVP) list, one of the initial block vector for the current block or the final block vector for the current block as a candidate block vector predictor; and decoding, based on the candidate block vector predictor derived from the HMVP list, a subsequent block.

2. The method of claim 1, wherein the BVD has a resolution of one of single pixel, two pixels, four pixels, 1/16 pixel, 1/8 pixel, 1/4 pixel, or 1/2 pixel.

3. The method of claim 1, wherein the candidate block vector predictor is the final block vector, and wherein the subsequent block comprises a second IntraTMP coded block.

4. The method of claim 1, wherein the candidate block vector predictor is the initial block vector, and wherein the subsequent block comprises a second IntraTMP coded block.

5. The method of claim 1, wherein the candidate block vector predictor comprises an intra block copy advanced motion vector prediction (IBC AMVP) candidate block vector predictor for the subsequent block.

6. The method of claim 1, wherein the candidate block vector predictor is the final block vector, and wherein the subsequent block comprises an intra block copy (IBC) merge mode coded block.

7. The method of claim 1, wherein the candidate block vector predictor is the initial block vector, and wherein the subsequent block comprises an intra block copy (IBC) merge mode coded block.

8. The method of claim 1, wherein refining the initial block vector using the template matching cost comprises:

performing a motion search to form a plurality of motion vector prediction (MVP) candidates, the initial block vector being one of the MVP candidates;

calculating template matching costs for each of the plurality of MVP candidates according to the current neighboring template to the block and flipped neighboring reference templates for reference blocks referred to by the MVP candidates, each of the flipped neighboring reference templates being flipped according to the flip mode; and selecting one of the MVP candidates having a lowest template matching cost as the refined block vector.

9. The method of claim 8, wherein performing the motion search comprises performing the motion search as one of an iterative two-step diamond search followed by an iterative one-step cross search; a full search; an iterative square search; or a one-dimensional search according to the flip mode.

10. The method of claim 1, wherein calculating the template matching cost comprises assigning each sample of the current neighboring template a sample-adaptive weight value according to a region of the current neighboring template that includes the sample.

11. The method of claim 1, further comprising encoding the current block prior to decoding the current block.

12. A device for decoding video data, the device comprising:

a memory configured to store video data; and a processing system implemented in circuitry and configured to:

decode a block vector difference (BVD) value for a current block of video data, the current block of video data comprising a reconstruction-reordered intra-block copy (RR-IBC) block that is flipped according to a flip mode;

determine an initial block vector for the current block of video data using intra template matching prediction (IntraTMP);

apply the BVD value to the initial block vector to form a final block vector for the current block of video data, wherein to apply the BVD value, the processing system is configured to:

calculate a template matching cost according to a current neighboring template to the current block and a flipped neighboring reference template for a reference block referred to by the initial block vector, the flipped neighboring reference template being flipped according to the flip mode;

refine the initial block vector using the template matching cost to form a refined block vector; and apply the BVD value to the refined block vector to form the final block vector;

decode the current block using the final block vector;

insert, into a history-based motion vector prediction (HMVP) list, one of the initial block vector for the current block or the final block vector for the current block as a candidate block vector predictor; and decode, based on the candidate block vector predictor derived from the HMVP list, a subsequent block.

13. The device of claim 12, wherein the BVD has a resolution of one of single pixel, two pixels, four pixels, 1/16 pixel, 1/8 pixel, 1/4 pixel, or 1/2 pixel.

14. The device of claim 12, wherein the candidate block vector predictor is the final block vector and wherein the subsequent block comprises a second IntraTMP coded block.

15. The device of claim 12, wherein the candidate block vector predictor is the initial block vector and wherein the subsequent block comprises a second IntraTMP coded block.

16. The device of claim 12, wherein the candidate block vector predictor comprises an intra block copy advanced motion vector prediction (IBC AMVP) candidate block vector predictor for the subsequent block.

17. The device of claim 12, wherein refining the initial block vector using the template matching cost comprises:

performing a motion search to form a plurality of motion vector prediction (MVP) candidates, the initial block vector being one of the MVP candidates;

calculating template matching costs for each of the plurality of MVP candidates according to the current neighboring template to the block and flipped neighboring reference templates for reference blocks referred to by the MVP candidates, each of the flipped neighboring reference templates being flipped according to the flip mode; and selecting one of the MVP candidates having a lowest template matching cost as the refined block vector.

18. The device of claim 17, wherein performing the motion search comprises performing the motion search as one of an iterative two-step diamond search followed by an iterative one-step cross search; a full search; an iterative square search; or a one-dimensional search according to the flip mode.

19. The device of claim 12, wherein calculating the template matching cost comprises assigning each sample of the current neighboring template a sample-adaptive weight value according to a region of the current neighboring template that includes the sample.

20. The device of claim 12, further comprising encoding the current block prior to decoding the current block.

21. The device of claim 12, further comprising a display configured to display the decoded video data.

22. The device of claim 12, wherein the device comprises one or more of a camera, a computer, a mobile device, a broadcast receiver device, or a set-top box.

23. A device for decoding video data, the device comprising:

means for decoding a block vector difference (BVD) value for a current block of video data, the current block of video data comprising a reconstruction-reordered intra-block copy (RR-IBC) block that is flipped according to a flip mode;

means for determining an initial block vector for the current block of video data using intra template matching prediction (IntraTMP);

means for applying the BVD value to the initial block vector to form a final block vector for the current block of video data, including:

means for calculating a template matching cost according to a current neighboring template to the current block and a flipped neighboring reference template for a reference block referred to by the initial block vector, the flipped neighboring reference template being flipped according to the flip mode;

means for refining the initial block vector using the template matching cost to form a refined block vector; and means for applying the BVD value to the refined block vector to form the final block vector;

means for decoding the current block using the final block vector;

means for inserting, into a history-based motion vector prediction (HMVP) list, one of the initial block vector for the current block or the final block vector for the current block as a candidate block vector predictor; and means for decoding, based on the candidate block vector predictor derived from the HMVP list, a subsequent block.

24. A non-transitory, computer-readable storage medium having stored thereon instructions that, when executed, cause a processing system of a device for decoding video data to:

decode a block vector difference (BVD) value for a current block of video data, the current block of video data comprising a reconstruction-reordered intra-block copy (RR-IBC) block that is flipped according to a flip mode;

determine an initial block vector for the current block of video data using intra template matching prediction (IntraTMP);

apply the BVD value to the initial block vector to form a final block vector for the current block of video data, including instructions that cause the processing system to:

calculate a template matching cost according to a current neighboring template to the current block and a flipped neighboring reference template for a reference block referred to by the initial block vector, the flipped neighboring reference template being flipped according to the flip mode;

refine the initial block vector using the template matching cost to form a refined block vector; and apply the BVD value to the refined block vector to form the final block vector;

decode the current block using the final block vector;

insert, into a history-based motion vector prediction (HMVP) list, one of the initial block vector for the current block or the final block vector for the current block as a candidate block vector predictor; and decode, based on the candidate block vector predictor derived from the HMVP list, a subsequent block.

25. The device of claim 12, wherein the candidate block vector predictor is the final block vector and wherein the subsequent block comprises an intra block copy (IBC) merge mode coded block.

26. The device of claim 12, wherein the candidate block vector predictor is the initial block vector and wherein the subsequent block comprises an intra block copy (IBC) merge mode coded block.

* * * * *